US010222099B2

United States Patent
Oezcan et al.

(10) Patent No.: US 10,222,099 B2
(45) Date of Patent: Mar. 5, 2019

(54) MULTI-MATERIAL-BLADE FOR ACTIVE REGENERATIVE MAGNETO-CALORIC AND ELECTRO-CALORIC HEAT ENGINES

(75) Inventors: Sibel Oezcan, Cambridge (GB); Paul Burdett, Cambridge (GB); Neil Wilson, Cambridge (GB)

(73) Assignee: CAMFRIDGE LTD., Cambridge (GB)

( * ) Notice: Subject to any disclaimer, the term of this patent is extended or adjusted under 35 U.S.C. 154(b) by 1052 days.

(21) Appl. No.: 14/126,240

(22) PCT Filed: Jun. 29, 2012

(86) PCT No.: PCT/EP2012/062695
§ 371 (c)(1),
(2), (4) Date: Apr. 17, 2014

(87) PCT Pub. No.: WO2013/001061
PCT Pub. Date: Jan. 3, 2013

(65) Prior Publication Data
US 2014/0216057 A1    Aug. 7, 2014

(30) Foreign Application Priority Data

Jun. 30, 2011   (GB) .................................... 1111235.6
Aug. 26, 2011   (EP) .................................... 11178955

(51) Int. Cl.
F25B 21/00     (2006.01)
(52) U.S. Cl.
CPC ........ F25B 21/00 (2013.01); *F25B 2321/002* (2013.01); *Y02B 30/66* (2013.01)
(58) Field of Classification Search
CPC .................. F25B 2321/0022; F25B 21/00
See application file for complete search history.

(56) References Cited

U.S. PATENT DOCUMENTS

| 6,526,759 B2 * | 3/2003 | Zimm | F25B 21/00 62/3.1 |
| 8,037,692 B2 * | 10/2011 | Muller | F25B 21/00 62/3.1 |

(Continued)

FOREIGN PATENT DOCUMENTS

| JP | 2010025435 A | 2/2010 |
| WO | 03016794 A1 | 2/2003 |

(Continued)

OTHER PUBLICATIONS

International Search Report issued in connection with the corresponding International Application No. PCT/EP2012/062695 dated Mar. 19, 2013.

*Primary Examiner* — Flip Zec
(74) *Attorney, Agent, or Firm* — The H.T. Than Law Group

(57) ABSTRACT

The present invention describes the design and fabrication of Multi-Material-Blades used as active regenerative regenerators in active regenerative magneto-caloric or electro-caloric engines. The blades consist of a plurality of elements (2) that divide the blade body along its length. Each element (2) is made of a different magneto-caloric or electro-caloric material selected appropriately, and a plurality of dedicated channels (3) penetrates the blade body (1) and extends along the length of the blade. The dedicated channels (3) can be provided with fluid mixing structures, porous layers or hydrophobic coatings to reduce the HE loss in an active regenerative engine. The Multi-Material-Blades are obtainable by ink jet printing techniques to reduce costs. The Multi-Material-Blades can further have a curved shape to form an involute blade body (1). All measures can improve (Continued)

the performance of active regenerative magneto-caloric or electro-caloric engines, and lay the basis for commercial solutions.

2 Claims, 13 Drawing Sheets

(56) References Cited

U.S. PATENT DOCUMENTS

| | | |
|---|---|---|
| 8,551,210 B2 | 10/2013 | Reppel et al. |
| 2008/0078184 A1* | 4/2008 | Saito ................. F25B 21/00 62/3.1 |
| 2011/0048031 A1 | 3/2011 | Barve et al. |
| 2011/0048690 A1 | 3/2011 | Reppel et al. |
| 2011/0173993 A1* | 7/2011 | Muller ................ F25B 21/00 62/3.1 |
| 2011/0314836 A1* | 12/2011 | Heitzler ............... F25B 21/00 62/3.1 |
| 2012/0031108 A1* | 2/2012 | Kobayashi ........... F25B 21/00 62/3.1 |
| 2012/0079834 A1 | 4/2012 | Dinesen et al. |
| 2013/0232993 A1* | 9/2013 | Saito ................. F25B 21/00 62/3.1 |

FOREIGN PATENT DOCUMENTS

| | | | |
|---|---|---|---|
| WO | 2008142253 A2 | 11/2008 | |
| WO | WO 2010106242 A1 * | 9/2010 | ............. F25B 21/00 |

* cited by examiner

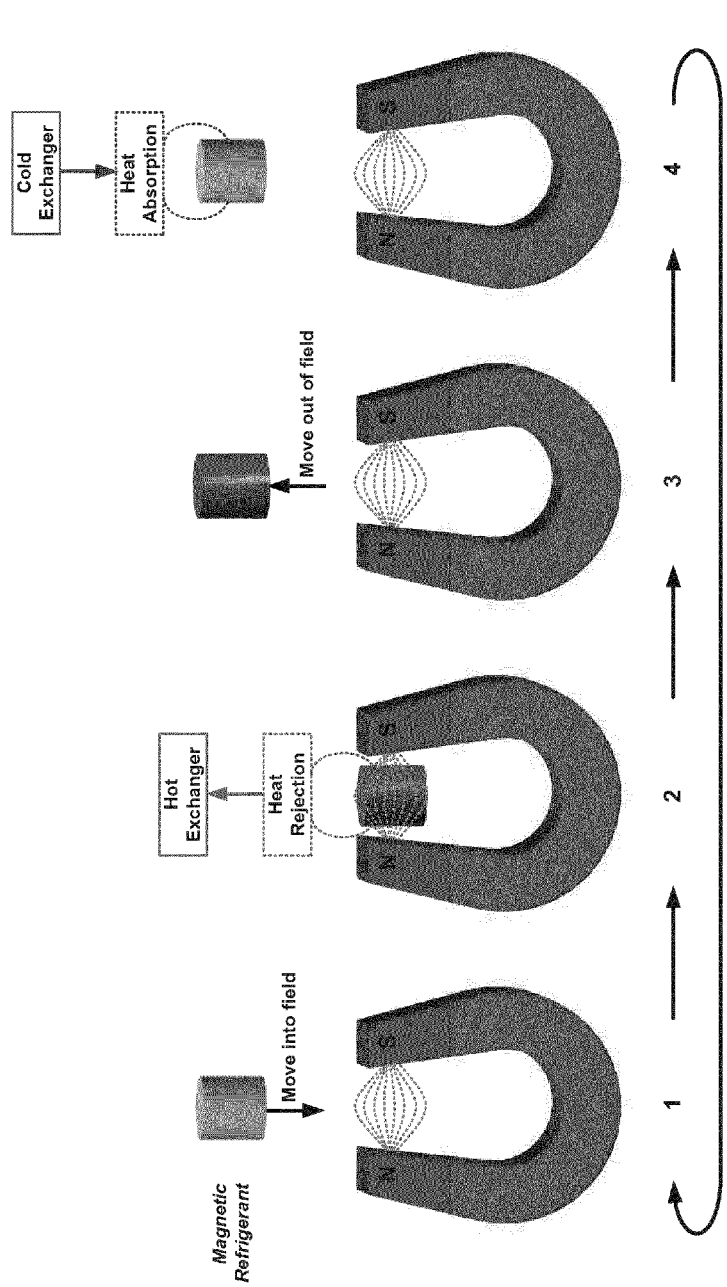
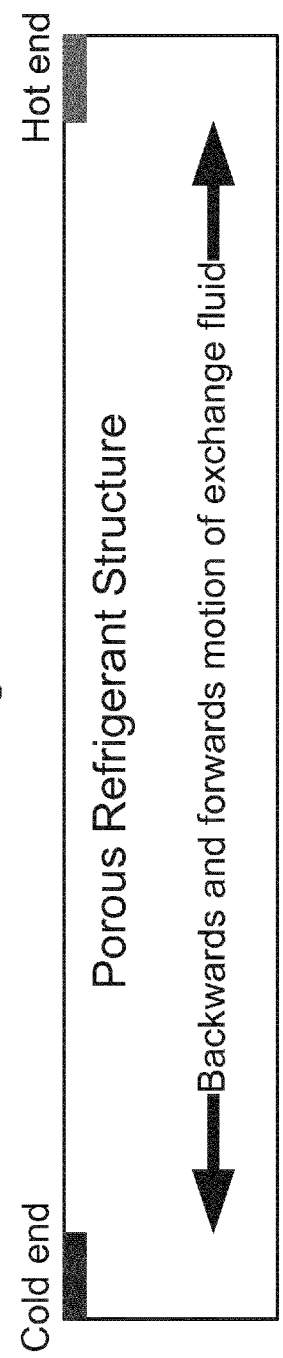
Fig. 1a
Fig. 1b

MULTI-MATERIAL-BLADE FOR ACTIVE REGENERATIVE MAGNETO-CALORIC AND ELECTRO-CALORIC HEAT ENGINES

INTRODUCTION

The present invention relates to a Multi-Material-Blade for use in an active regenerative magneto-caloric or electro-caloric heat engine. In particular the Multi-Material-Blade acts as an active magnetic regenerator (AMR) or an active electro-caloric regenerator (AER) in the respective engine, and is designed to significantly improve its performance.

Such heat engines are useable in cooling, heat pumping and energy recovery applications.

The active magnetic regenerative engine and the active magnetic regenerator were first identified by Barclay (see e.g. U.S. Pat. No. 4,332,135) as being capable of exploiting the magneto-caloric effect of ferromagnetic materials, in order to deliver refrigeration and cooling over a relatively wide temperature range. An earlier device referred to as the Brown magneto-caloric device (see U.S. Pat. No. 4,069,028) also utilized a regenerative cycle, although not an active magnetic regenerative cycle.

Materials

Magneto-caloric materials exhibit the magneto-caloric effect (MCE), which is the change in temperature upon the application or removal of a magnetic field (typically measured under adiabatic conditions). Under iso-thermal conditions, the application or removal of a magnetic field drives a change in entropy in the MCE material.

Electro-caloric materials exhibit the electro-caloric effect (ECE), which is the change in temperature upon the application or removal of an electric field (typically measured under adiabatic conditions). Under iso-thermal conditions, the application or removal of an electric field drives a change in entropy in the ECE material.

The presence of the field (either electric or magnetic depending on the material) forces a transition from one entropy state to another. The size of the entropy change depends on the magnitude of the applied field and the sign of the change depends on the nature of the transition. The characteristic temperature at which the transition associated with the entropy change occurs is known as the Curie temperature (Tc).

Materials that exhibit these properties include, but are by no means limited to Gd (ferromagnetic-paramagnetic transition), RhFe (metamagnetic anti-ferromagnetic to ferromagnetic transition), BaTiO3 (ferroelectric to paraelectric transition), and e.g. P(VDF-TrFE-chlorofluoroethylene) (showing relaxor ferroelectric behaviour).

Basic Magnetic Cooling Cycle

A basic (non-regenerative) magnetic cooling cycle is shown in FIG. 1a, for a magneto-caloric material showing a positive temperature change when exposed to a magnetic field (e.g. paramagnetic-ferromagnetic) transition.

When the stages 1 to 4 are performed, the magneto-caloric material ideally follows a cycle, ABCD, shown in FIG. 2a. AB and CD are "adiabatic" temperature changes due to the increasing or falling magnetic fields, respectively, and correspond to the stages 1 and 3 of FIG. 1a, respectively. BC and DA is accomplished through heat exchange between the magneto-caloric-material and an exchange fluid, and correspond to the stages 2 and 4 of FIG. 1a, respectively. The exchange fluid can absorb or reject heat to the outside world via heat exchangers. The adiabatic temperature change of the magneto-caloric material is labelled as $\Delta T$ (hot and cold).

The maximum span (difference between $T_{cold}$ and $T_{hot}$) of this cycle is the 'adiabatic' temperature change ($\Delta T_{cold}$ or $\Delta T_{hot}$) with low cooling power. The maximum cooling power is $\Delta S \cdot T_{mean}$ at low span (where $\Delta S$ is given by CA in FIG. 2a). Similar cooling cycles can be generated for electro-caloric materials.

Useful properties of a magneto-caloric (or electro-caloric) material can be characterised by mapping $\Delta S(T)$ and $\Delta T(T)$ for rising and falling magnetic or electric fields. This is illustrated in FIG. 2c. In fact the $\Delta S$ and $\Delta T$ curves are the differences (in either temperature or entropy) versus temperature between the low-field and high-field curves shown in FIG. 2a. It is these $\Delta S$ and $\Delta T$ curves, and the corresponding T-S diagrams that are used to design optimal cooling cycles.

Active Regenerative Cycle

The active magnetic regenerative cycle of Barclay, delivered a significant extension of the temperature span over the basic magnetic cycle described earlier.

When the magnetic refrigerant is made hot by the application of a magnetic field, an exchange fluid flowing through an open porous arrangement of refrigerant material moves 'heat' to one end. When the refrigerant material is cooled by removal of the magnetic field the same exchange fluid is reversed and moves 'cold' to the other end. When the exchange fluid is cyclically blown between the two ends of the AMR, and the magnetic field is applied and removed with the same periodicity, a temperature gradient is established between the cold end side and the hot end side of the AMR. The conceptual idea is shown in FIG. 1b. The result is that across the refrigerant significant temperature gradients of 30K (or more) can be created.

At any point in an idealized AMR, the local refrigerant material, applied field and the local temperature will determine the actual local TS (ABCD) type loop. However, each point is coupled via the exchange fluid, and so collectively the entire bed can be thought of as undergoing an exchange fluid coupled cascade corresponding to the A"B"C"D'A' cycle in FIG. 2b.

STATE OF THE ART

The AMR design of Barclay consists of magneto-caloric materials with an open porous structure, and the exchange fluid interpenetrates the magneto-caloric material and exchanges heat with the magneto-caloric material. A simple open porous structure is a packed bed of powder, and extensive work has been undertaken on such packed bed regenerators (U.S. Pat. No. 4,332,135, U.S. Pat. No. 6,526, 759) and also on Solid Packed Bed Regenerators (US 2010/0107654 A1). Impressive temperature gradients between the hot side and the cold side have been achieved.

However, a powdered bed has several disadvantages. The primary disadvantage is its low operating speed, typically only 0.1 Hz to 1 Hz. The operating speed is the frequency with which the exchange fluid and magnetic field can be cycled. The low frequency translates into a relatively large, heavy and expensive solution per Watt of cooling. The frequency limitation arises due to high pressure drops across the porous packed bed AMR, when using a liquid exchange fluid, at higher frequencies. The pressure drops results in large viscous and thus pumping losses. Although utilizing a gaseous exchange medium could reduce the pressure drops and the viscous losses, the available cooling power is limited due to the low heat capacity of gases.

Another disadvantage of powdered beds is that the highest packing density that can be achieved is 74% (in hexagonal close packing (HCP) also face centred cubic (FCC)), and in practice the actual achievable packing densities are even lower. At best 26% of the magnetic field volume is not occupied by magneto-caloric material. Maximising the utilization of the magnetic field is however critical to achieving a commercial solution that meets cost and size requirements and utilizes compact magnets.

Furthermore, the above-mentioned "adiabatic temperature change" AB is in reality less than adiabatic, because of the presence of the exchange fluid in direct contact with the magneto-caloric material, to which heat is transferred. The cycle ABCD shown in FIG. 2 is therefore more like the cycle AFCE also shown in FIG. 2. Rather than the full $\Delta T$ temperature change, the change of the magneto-caloric material is only $\Delta T$-$\delta T$. Accordingly, $\Delta S$ (which is related to the cooling power) is no longer the entropy difference between D and A, but rather the smaller difference between E and A. In order to get closer to the ideal cycle, the heat capacity ratio between the exchange fluid and the magneto-caloric material needs to be minimised. This can be achieved either by increasing the packing density of the magneto-caloric material, by reducing the relative amount of exchange fluid, or by lowering the heat capacity of the exchange fluid relative the heat capacity of the magneto-caloric material.

Channel based geometries avoid the limitations of packed bed as the packing density of the AMR can in principle be set to any value between 0% (no magneto-caloric material) to 100% (no channels). Increasing the packing density of the material allows for the optimisation of both the refrigeration cycle, i.e. to make AF as close to AB (or CD as close to CE) as desired and at the same time maximizing the magnetic field utilization, whilst maintaining finite sized and regular (and thus low pressure) channels.

At the same time regular channels lower pressure drops and thus viscous losses.

A number of channel based geometries have been discussed (Tishin, "The magnetocaloric effect and its applications", IOP publishing 2003, and the references therein).

However the challenge for a commercial refrigerator device is to achieve a high temperature gradient between the cold end and the hot end of the AMR, while using reasonably sized magnets and compact AMRs.

Magneto-caloric (and electro-caloric) materials exhibit the highest $\Delta T$ and $\Delta S$ in the vicinity of their Curie temperatures Tc (FIG. 2c shows peak $\Delta S$ at ~293K for a magneto-caloric material) although depending on the nature of the transition the maximum may be sharp or flat and broad. For the design of an optimal AMR (or AER) it is essential to have materials with a high $\Delta T$ and $\Delta S$ along the whole length of the AMR (or AER). Multiple materials will therefore be used with $\Delta S$ and $\Delta T$ optimised against the temperature range in which they will operate. The choice of suitable magneto-caloric materials and a detailed modelling of the AMR (or AER) structure are very important to reach efficient designs.

At the same time the total cooling power of an AMR (or AER) depends on the number of cycles per second (ABCD or AFCE) the AMR (or AER) can undergo, with simultaneous heat exchange with the exchange fluid and the hot and cold exchangers. High operating frequencies, i.e. fast movement round the above-described cycle ABCD (or AFCE), is thus essential for small and compact solutions.

The actual cooling power (per unit of input power) depends on losses, and is a measure, of how much of the cooling capacity of the refrigerant can be released from the magneto-caloric material of the AMR (or AER) into the exchange fluid, and can consequently be carried out at the cold end of the AMR (or AER), by a blow from hot to cold, into the cold exchanger (or out the hot end of the AMR (or AER), by a blow from cold to hot, into the hot exchanger for heat pumping applications).

Ideally the actual cooling power and the cooling capacity (per unit of input work) should be the same. The difference, however, between the actual cooling power and the cooling capacity (per unit of input work) is referred to as the "total loss", which is made up of a number of different contributing factors. Loss associated with the transport of heat in the exchange fluid is referred to herein as "HE loss"; this loss is associated with temperature gradients within the exchange fluid. Loss associated with backflow of heat through the AMR from hot to cold is called "backflow loss". Loss associated with local heat flow within the refrigerant material is called "local loss". Loss associated with hysteresis is called "hysteretic loss". Loss associated with the pumping of the fluid is called "viscous loss", and is associated with viscous dissipation in the fluid. The design of an optimal AMR requires minimisation of all the losses.

In a magnetic heat engine a large physical component is the magnet. Maximising magnetic field utilisation (through for example a high packing density) per unit volume of refrigerant is therefore an imperative for a compact solution.

In general, the objective problem of the present invention is to overcome the above-mentioned disadvantages of the state of the art, and to provide an AMR (or AER) that improves the performance of an active regenerative magneto-caloric or electro-caloric engine. The ultimate goal is to make the respective engine commercially feasible.

In particular, the present invention seeks to:
1. Specify material selection criteria for high performance multi-material AMR or AER devices.
2. Specify optimal architectures for optimal channel based regenerators
3. Specify optimal geometries for channel based regenerators to minimize losses (HE loss, local loss, backflow loss, viscous loss), maximize performance and maximize applied field utilisation.
4. Specify enhancements to architectures and geometries to minimize losses and aid in manufacturing.
5. Specify methods for fabrication of optimal architectures and enhancements.

The AMR or AER should further be easy to assemble, have sufficient mechanical strength, a reliable structure, and should comprise materials that are easy to process.

The present invention also aims to reduce the size and cost of the AMR (or AER) and the active regenerative engine, and aims to manufacture the AMR (or AER) with automated high-speed and low-error manufacturing processes.

SUMMARY OF THE INVENTION

The present invention is therefore directed to a Multi-Material-Blade for use in an active regenerative magneto-caloric or electro-caloric engine for use in cooling, heat pumping and energy recovery applications.

The blade comprises a blade body made from a plurality of elements made from different magneto-caloric or electro-caloric materials, wherein the blade body is divided along its length into said plurality of elements. The blade further comprises a plurality of dedicated channels, which penetrate the blade body and extend along the length of the blade.

Selection of Materials

Preferably, each of the plurality of elements is made from a magneto-caloric material preferably selected from the group of LaFeSi, LaFeSiCo, LaFeSiH, MnPFeAs, MnPFeSi, FeRh, MnAsSb, MnPFeGe, Gd, GdDy, CoMnSi, CoMnGe, and GdSiGe, that may additionally be provided with one or more dopants (which often shifts the Tc either up or down for a material family), and may have varying ratios of the specified elements, wherein each magneto-caloric material has a different Curie temperature, and each magneto-caloric material has a porosity of 20% or less in respect to its volume.

Suitable electro-caloric materials include P(VDF-TrFE-chlorofluoroethylene), PLZT (8/65/35), Pb(Mg1/2Nb2/3)O3-35PbTiO3 (PMN-35PT)), BaTiO3, or (NH4)2SO4.

In an ideal system (neglecting losses), at a mean cold side temperature $T_{cold}$ the cyclic cooling energy available from a refrigerant is given by $T_{cold} \cdot \Delta S'_{cold}$ for a given applied field B (where $\Delta S'_{cold}$ is given by the absolute entropy difference between points D' and A' in FIG. 2b (or in practice E' and A').

In a regenerative cooling cycle, spanning from a mean $T_{cold}$ to a mean hot side temperature $T_{hot}$, the length portion of the regenerator contributing to cooling is $\sim \Delta T_{cold} \cdot$Length/Span, wherein Span is defined as the temperature gradient $T_{hot} - T_{cold}$ (between the hot end and the cold end of the AMR or AER), and Length is the length of the AMR (or AER). This can be simply demonstrated for an ideal system by a skilled person using a simple geometric argument, assuming the exchange fluid entering the regenerator has an appropriate temperature profile. A first order estimate of the total (cyclic) Regenerator Cooling Capacity in (J) of a multilayer AMR (or AER) is proportional to $\Delta T_{cold} \cdot \Delta S_{cold} \cdot T_{cold} \cdot$Length·Area·Density·Packing-Density/Span in an 'ideal' multilayer configuration, wherein Length is the length of the regenerator, Area is the cross-sectional area of the regenerator, Density is the density of the material and Packing-density is % volume with active refrigerant, i.e. magneto-caloric or electro-caloric, material. The proportionality factor between the cooling capacity and the above equation might vary between 0 and 1 (under some special circumstances it can even be more than 1). For a linear temperature profile along the whole regenerator the proportionality factor is 0.5.

This discussion is not limited to cooling applications, and is applicable for heat engines being used for heat pumping and energy recovery applications.

Extracting the material properties (and neglecting density) from the above equation yields a figure of merit of a magneto-caloric (or electro-caloric) material, which is simply $\Delta T \Delta S$. In a practical device the size of the applied field is relevant, especially from an economic point of view, and a further refinement would normalize this value against the applied field. For simplicity, taking the peak values of both $\Delta S$ and $\Delta T$ for a material, the figure of merit can be used to compare different materials. Some of the key developments for magneto-caloric materials are summarized in table below.

| Material | Example Material | ΔS (1T) (J/Kg K) | ΔT (1T) (K) | Figure of merit (J/kg) |
|---|---|---|---|---|
| 1$^{st}$ Generation | Gd | ~2.5 | ~3 | ~7.5 |
| 2$^{nd}$ Generation | LaFe$_{13}$SiCo type | ~5.5 | ~2.2 | ~12.1 |
| 3$^{rd}$ Generation | LaFe$_{13}$SiH type | ~10 | ~3.5 | ~35 |

Generally a higher figure of merit is preferable over a lower one, although considerations such as hysteresis, or speed or longevity of the magneto-caloric (or electro-caloric) effect, or shaping properties, may result in selecting materials with a lower figure of merit.

The maximum entropy difference $\Delta S$ and the maximum $\Delta T$ occurs at (or in the vicinity) of the Curie temperature. When multiple materials with increasing or decreasing Curie temperatures are cascaded in the right way, they can trace the temperature defined by the temperature gradient between the hot and cold end of the blade. When such suited materials are used at various temperature points along the length of the blade, the total temperature gradient, when a magnetic (or electric) field is cyclically applied and exchanged fluid is cyclically pumped through the blade, can be significantly increased. Furthermore, it is not sufficient to consider Curie temperature alone. The regenerator cooling capacity of the plurality of elements needs to be maximised along the length of the regenerator. In addition the plurality of elements must have a slowly rising regenerator cooling capacity, the rate of rise proportional to the span of the AMR (or AER) and proportional to the input work needed to drive the cooling cycle.

Expressing the previous regenerator equation in terms of local parameters, the cooling capacity of a given element of the plurality of elements of the regenerator, is defined as $$\Delta T_{cold,EL} \cdot \Delta S_{cold,EL} \cdot T_{cold,EL} \cdot \text{Length}_{EL} \cdot \text{Area}_{EL} \cdot \text{Density}_{Loc} \cdot \text{Packing-Density}_{EL}/\text{Span}_{EL},$$

for that element, where $T_{cold,EL}$, $\Delta S_{cold,EL}$, and $\Delta T_{cold,EL}$ are the local cold temperature, entropy and 'adiabatic' temperature change of the local material in the element, Length$_{EL}$ is the length of the element, Area$_{EL}$ is the cross-sectional area of the element, density is the density of the local material in the element, and Packing-density$_{EL}$ is the local element packing density (% volume of active refrigerant to total volume) and Span$_{EL}$ is the span across the element. The sum of the spans across each element is the total span across the regenerator. The cooling capacity of each element of the regenerator rises at a rate proportional to the local temperature gradient established along that particular element. If the temperature gradient is constant along the whole regenerator, then the local temperature gradient of each element is equal. In any case, the span of the whole regenerator is the sum of the spans of the plurality of elements.

Note that for cooling capacity calculations, absolute values of $\Delta S$ and $\Delta T$ are used in all circumstances. This is understood to be the case throughout this document.

Note that in practice, often area, density and packing density are the same or similar across multiple elements; however length can be considerably different between elements, and is therefore a useful parameter that can be used for tuning the cooling capacity of elements.

At the boundary between elements, and where the adjacent element is made of a different material with a different Curie temperature, and thus possessing differing $\Delta S$ and $\Delta T$ properties, a smooth transition between cooling capacities is ideally required. This can be achieved by adjusting the length of individual elements or choosing the appropriate material or the Curie temperature.

Nevertheless, the change between elements with different Tc is discontinuous, and only a quasi continuous cooling capacity can be achieved, such that the variation is no more than 30% immediately between neighbouring elements (for both an up and down field change). That means the cooling capacity at a boundary between two elements along the blade body matches within 30%. A change in cooling capacity from one element to the other at an element boundary is thus below 30%. The minimum in cooling capacity within an element is located at either of the two ends of the element.

Sharply changing ΔS and ΔT curves (such as found in first order type materials e.g. FIG. 2c) will necessitate the use of many different materials, and shorter length scales for each element will be required to ensure quasi-continuous cooling capacity.

If the temperature gradients across each of the plurality of elements are as closely matched as possible, no local temperature gradients are created between the elements so that the local losses within the regenerator are minimized. However, it could also be desired to have regions of flat temperature gradient at the ends of the regenerator.

Additionally, local temperature gradients (either upon a field rise or a field fall) can occur at the interface between two materials with differing Tc and therefore ΔT curves. This may cause enhanced backflow locally, or locally forward flow of heat against the prevailing temperature gradient. To avoid such local temperature gradients, which generate entropy that disrupts the performance of any active regenerative magneto-caloric engine, ΔT curves should be matched as closely as possible at the interface. However as FIG. 2c shows, the ΔT curves for an up and down field at a given temperature can be quite different and therefore such matching, although desirable, is not completely possible. Thus low thermal conductivity separators between different materials can be used. These separators have little impact on the ratio of overall backflow loss to cooling power (as the cooling power falls linearly with total spacer length, as does backflow), but reduce 'local loss' entropy generation.

The present invention is directed to the material selection criteria for the plurality of elements in the multi-material blade, such that materials with high figures of merit (greater than gadolinium) are utilised, and the cooling capacity is maximised along the length of the AMR (or AER). In addition the cooling capacity should be quasi-constant (within 30%, and preferably lower) immediately between neighbouring elements, rising along the length of the regenerator at a rate proportional to the span and input work of the regenerator, with the lowest cooling capacity in any element located at one of the two ends.

Furthermore, in order of priority, Curie temperatures (Tc) along the length of AMR (or AER) from cold to hot should increase, cooling capacity should be matched at material interfaces (for both up and down field changes) (by correct selection of material Tc, packing density, density and element length), and the difference between ΔT curves at material interfaces (for both up and a down field change) should be minimised. The aforementioned material selection criteria applies to all channel architectures (described in more detail below), including, but not limited to, parallel plates (FIG. 4), stacks of parallel plates, stacks of parallel plates with 90° rotation (FIG. 3), perforated plates (FIG. 9), stacks of perforated plates (FIG. 8) and involutes (FIG. 16) and enhanced variations (described herein) thereof.

Furthermore, the present invention is directed to spacers, present here to minimize local losses between elements of different materials, and reduce the local losses in the AMR (or AER) design, dimensioned to minimize local back flow. Local temperature gradients, rather than overall temperature gradients (span/length) considerations, are used to dimension them (with the preferred thickness in the 50 um to 1000 um range). Such spacers should be made of low thermal conductivity material (preferably 0.01 to 2 W/mK) and allow the flow of exchange fluid between neighbouring elements either through an open porous structure or shaped so as not to completely block channels. The above arrangement of magneto-caloric materials is valid for all channel based architectures according to the present invention.

Preferably, each of the plurality of elements has a thermal conductivity in a range of 0.1 W/mK to 30 W/mk, preferably 0.1 W/mK to 10 W/mk, more preferably 0.1 W/mK to 5 W/mk or more preferably 0.1 W/mK to 2 W/mK. A low thermal conductivity of the plurality of elements minimizes so called backflow loss in the AMR (or AER). Backflow loss is the heat that naturally flows from the hot end of the blade to the cold end of the blade, when utilized in a magneto-caloric or electro-caloric engine. To achieve the low thermal conductivity, suited materials have to be used. Further, when the plurality of elements are for example each made of extruded bound powders of different magneto-caloric materials, a low thermal conductivity binding agent is preferably used. The binding agent preferably is to have a thermal conductivity that is lower or at most equal to the thermal conductivity of the magneto-caloric materials.

The above-stated materials (and their variants) can be selected to exhibit a large magneto-caloric (or electro-caloric) effect and a high figure of merit, have a low thermal conductivity, and can be manufactured on the appropriate length scales. The materials have Curie temperatures $T_c$ in the desired temperature range. The materials are suited to provide elements with different Curie temperatures along the length of the blade, in order to increase the total temperature gradient that is established in the regenerative cycle. Moreover the cooling capacities of these materials can be matched to provide an optimal solution.

Architectures and Geometries

Architectures with dedicated channels through the blade body help to avoid the high pressure losses that occur in packed bed AMRs. The objective of an advanced AMR (or AER) design is to provide maximal cooling whilst minimizing losses. Selecting materials according to the previously mentioned criteria maximizes the cooling potential of an AMR (or AER). However, minimizing losses requires further examination.

Losses in an AMR (or AER) system increase the quantity of input work required to achieve an amount of cooling, thus lowering the efficiency of the AMR device. Correct dimensioning of the architecture of the AMR (or AER) is required in order to minimise losses.

As already outlined, some of the principle losses associated with an AMR (or AER) are HE loss, backflow loss, viscous loss, local loss and hysteretic loss. Backflow loss can be minimised by using a low thermal conductivity refrigerant, spacers can be used in a multi-material blade to minimize local losses, and the use of low-hysteresis materials minimizes hysteresis loss. Channel architectures in general reduce viscous loss. However, the dominant loss in a channel AMR (or AER) system is the HE loss—associated with temperature gradients in the fluid whilst transferring heat from the refrigerant to the exchange fluid and thus to the heat exchangers.

For example, after a negative adiabatic temperature change, the hot fluid encounters cold refrigerant and rapid heat exchange happens (step CE in FIG. 2a). Then the fluid is blown from hot to cold, and the hotter fluid is pushed towards colder material, transferring heat from the fluid to the material, thus heating the refrigerant materials (step EA in FIG. 2a). The rate of heat transfer determines the time it takes for complete (or desired) refrigerant heat exchange (this normally limits the maximal operating frequency of the system). The fluid next to the wall is in thermal equilibrium with the refrigerant; however the fluid at the centre of the channel is warmer. Thus, apart from at the beginning of a cold blow, the average temperature of the fluid leaving the cold end of the AMR is warmer than the cold end of the AMR. The temperature gradient within the fluid channel determines how much of the cooling capacity of the refrigerant is actually available in the cold exchanger, as the presence of warmer fluid will dilute the overall cooling capacity of the exchange fluid. This reduction in cooling capacity is called HE loss. Analogous effects occur in a hot blow.

Fixing the pressure drop (or the viscous loss) across a channel of some length inside an AMR with a fixed steady average span, the heat transfer rate from refrigerant to liquid (or vice versa) scales with channel diameter (i.e. as channel diameter falls, heat transfer falls). The HE loss also falls as the channel diameter decreases, but does so at a faster rate (to a higher power of scaling) than the heat transfer rate. By reducing channel diameter, the HE loss can be scaled to an arbitrary small amount. However, the rate of heat transfer is also falling, thus limiting the upper bound of operating frequency. The heat transfer rate is the amount of heat per second that is being transferred from the fluid to the refrigerant (or vice versa). To compensate for reduced heat transfer rate, the amount of heat to be moved can be reduced by lowering the amount of refrigerant (e.g. using thinner plates). However, reducing the amount of refrigerant reduces the packing ratio of liquid to refrigerant in the AMR (or AER), resulting in CE diverging from CD, and reducing overall packing density. At the same time small refrigerant length scales are harder to fabricate.

Therefore, an AMR should be dimensioned such that sums of the viscous loss (determined by AMR length, exchange fluid physical properties and flow speed, as well as channel diameter), the backflow loss (determined by length, span, thermal conductivity of the refrigerant and fluid, volume of liquid and refrigerant), and HE loss (determined by channel width, properties of the exchange fluid, flow speed, $\Delta S$ and $\Delta T$ of the refrigerant, volume of liquid and refrigerant, and length & span of the AMR) is minimised, for a target operating frequency (in the range 1 Hz-20 Hz). A preferred solution has the three losses being of comparable size (to within a factor of 10 of each other). For a parallel plate channel within an element (including involutes) the optimal plate thickness should be in the range of 50 um to 1500 um, or more preferable 60 um to 700 um, or more preferable 70 µm to 700 µm, or more preferable 70 um to 350 um. The channel spacing should be in the range 5 um to 100 um, or more preferable 10 um to 75 um, or even more preferably, 15 um to 60 um.

For a perforated plate, the optimal distance between perforations should be in the range of 60 um to 2000 um, or more preferable 80 um to 1000 um, or more preferably 100 um to 650 um. The perforation diameter should be in the range 10 um to 150 um, or more preferable 15 um to 110 um, or even more preferably 20 um to 85 um.

The given values achieve a balance between viscous loss, backflow and HE loss.

The given length scales are somewhat dependent on the magneto-caloric materials that are used In the first example of a Multi-Material-Blade, each of the plurality of elements is formed by a plurality of plates, the plurality of plates are stacked on top of each other. Furthermore, each of the plurality of elements in the blade body is rotated in respect to its adjacent elements, preferably rotated by 90°. This arrangement supports the mixing of the exchange fluid, i.e. increases the thermal homogeneity across the dedicated channels and reduces the HE loss when used in an active regenerative magneto-caloric engine. Moreover, this arrangement enhances the reliability of complete assembly fabrication, as a continuously parallel channel along the length of the blade is not required. The length over which accurate parallel assembly is required is reduced down to the length of a single element rather than the complete blade. Preferable, the plates are separated from each other by at least one spacer preferably printed with well known ink jet printing techniques, stencil or screen printing, photolithography, or direct application by dotting or jetting system, wherein the separations between the plurality of plates forms the plurality of dedicated channels.

By using said well known technologies, and by consequently reducing the manufacturing costs, a commercial solution becomes feasible. The manufacturing becomes also simpler, faster and more reproducible. Such commercial off the shelf equipment (COTS) equipment can be utilized in the manufacturing process, and many manufacturing steps can be automated.

The present invention is further directed to a Multi-Material-Blade for use in an active regenerative magneto-caloric engine. The blade comprises a blade body made from a plurality of elements made from different magneto-caloric materials, wherein the blade body is divided along its length into said plurality of elements. The blade further comprises a plurality of dedicated channels, which penetrate the blade body and extend along the length of the blade. Each of the plurality of elements of the blade has a curved shape, so that the plurality of elements can form an involute blade body.

In a refrigerant device, a blade according to the present invention can deliver a unit amount of cooling power. By combining multiple blades, the cooling power can be increased without reducing the efficiency of the device. A combination of blades can for example be realized as a rotary magnetic system, where blades are arranged in a circle and are rotated through a magnetic field. As has been explained above, the magnetic field utilization is important. When cuboid blades are packed together in a circle, the packing density and correspondingly the magnetic field utilization will not be ideal. An involute design of the blade body, or the elements that make up a blade body, however, provides the possibility to pack multiple blades together in a perfect radial geometry with constant channel width in a rotary magnetic system. That means multiple blades can be assembled in a complete circle, wherein a constant spacing between different blades, and plates within the elements of the blade, can be maintained. This arrangement results in a 30% better field utilization. Correspondingly, smaller and less expensive magnets can be used.

Due to the dedicated channels through which fluid can flow, magneto-caloric materials with lower porosity can be used. The porosity of a material is typically caused by distributed pores and is a material property. The porosity can be understood as the volume of voids (pores) in the magneto-caloric material in respect to its total volume. In contrast thereto, the dedicated channels that can be actively created in the magneto-caloric materials are not considered to be porosity.

The present invention is further directed to a Multi-Material-Blade for use in an active regenerative magneto-caloric or electro-caloric engine. The blade comprises a blade body made from a plurality of elements made from different magneto-caloric, wherein the blade body is divided along its length into said plurality of elements. The blade further comprises a plurality of dedicated channels, which penetrate the blade body and extend along the length of the blade. The cross-section of the blade-body perpendicular to the dedicated channels has along a predetermined direction a plurality of regions of different porosity, wherein at an interface of adjacent regions the porosity changes abruptly by at least 10%.

The regions of higher porosity can, for example, act as the plurality of dedicated channels if it is an open porous structure (and these can also act like spacers), wherein the regions of lower porosity are made of denser magneto-caloric materials. However, dedicated channels can be provided in addition to the higher porosity material. The higher porosity regions can also function as a mixing structure for an exchange fluid. The mixing function of the porous regions reduces the HE loss, when the blade is used in an active regenerative magneto-caloric engine. The regions of higher porosity can be formed as flexible sponge-like structures, which can adapt and change their shape. In this way they can compensate for any unevenness caused in the manufacturing of the elements. The regions of higher porosity and lower porosity can be arranged likewise for each of the plurality of elements, or can be arranged differently for each element.

Several known methods could be employed to measure the porosity in a material, for example optical methods (i.e. determining the area of the material versus the area of the pores visible under the microscope), wetting methods i.e. immersion of a porous sample under vacuum in a fluid that preferentially wets the pores), water saturation method (i.e. the pore volume equals the total volume of water left after soaking) or water evaporation method (i.e. the pore volume equals the weight of a saturated sample minus the weight of a dried sample considering the density of water).

Any pores in the magneto-caloric material will not run through the whole blade body like the dedicated channels, but are usually rather short. Natural pores are typically in the order of 0.01 µm to 10 µm long, and are further rather small in diameter, namely in the order of 0.01 µm to 50 µm. In contrast to the dedicated channels, pores are distributed randomly in the magneto-caloric material.

The lower the porosity of the magneto-caloric material the higher the packing density of each of the plurality of elements can be made. The packing density is defined as the ratio of magneto-caloric material to the total volume of one of the plurality of elements, i.e. the volume including the volume of the dedicated channels.

The greatest amount of exchange fluid is desired to flow through the dedicated channels not the magneto-caloric material. A higher density can then be achieved for the magneto-caloric materials of the plurality of elements. In the dedicated channels lower pressures and viscous losses are further present.

Preferably, the porous spacer between elements is a porous material with a porosity of greater than 25% in respect to its volume, the porous material being preferably at least one of collagen-glycosaminoglycan collagen foam, polytetrafluoroethylene foam, spontex, and hydroxyapatite ceramic. In this case the spacer can additionally act as a mixing structure for exchange fluid and helps to reduce HE loss. The spacer can also adapt to unevenness on the plates, thus the flatness requirements of the plates are reduced.

In a further example of a Multi-Material-Blade, each of the plurality of elements is formed by a perforated plate, wherein a plurality of perforations in the perforated plates forms the plurality of dedicated channels.

This example allows thicker plates to be used to overcome the previously mentioned manufacturing limitations, albeit transferring the problem to making fine enough perforations. In this case, an element can be considered as one (or more) perforated plates with the same Curie temperature Tc.

In the parallel plate geometry, the most preferred plate thickness is in the range of 90 um to 400 um. These dimensions may be hard to fabricate accurately or reliably in certain materials. Using perforated plates, the plate thickness can be considerably more (by an order of magnitude), and the upper-bound is determined by the material selection criteria relating to "length" required for maximising cooling capacity outlined earlier.

Preferably, the plurality of perforations are a plurality of round and/or angular holes, a diameter or width of each of the plurality of holes is in a range of 10 µm to 150 µm, preferably 15 µm to 110 µm, or more preferable 20 um to 85 um. The distance between adjacent holes is in a range of 60 µm to 2000 um, preferably 80 µm to 1000 µm, or more preferably 80 µm to 600 or optionally 100 um to 650 um. The given length scales are again somewhat dependent on the magneto-caloric materials that are used. The preferred values, however, achieve the lowest HE loss, and the best heat transfer from the plates to the exchange fluid in an active regenerative magneto-caloric engine.

Enhancements

Minimisation of the HE loss necessitates relatively small length scale of fabrication—in terms of spacers, plates or perforations. For certain refrigerant materials manufacturing to such small length scales may be problematic.

The use of specially designed mixing structures in the dedicated channels to mix the exchange fluid reduces the HE loss, when the Multi-Material-Blade of the present invention is utilized in an active regenerative magneto-caloric engine. The mixing of the exchange fluid must be carried out so that the pressure losses increase less fast than the reduction of the HE loss occurs. The HE loss can be significantly reduced, since the addition of mixing structures increases the thermal homogeneity across the dedicated channels, and most importantly at the centre of the channel where the flow is fastest. Moreover, homogenising the temperature at the centre of the channels necessitates higher temperature gradients at the walls thereby further increasing heat transfer rates and allowing for increased frequency of operation.

Adding a hydrophobic coating layer to the dedicated channels (with or without mixing structure) can make a slip boundary condition occur between the exchange fluid and the magneto-caloric material, when the exchange fluid is driven through the channels. Per unit volume of exchange fluid, the HE loss could thus be reduced by 10-20% (or even more). A thin glass or plastic or similar layer can further be added below the hydrophobic coating layer, in order to increase the smoothness of the hydrophobic coating layer. The smoothness supports the occurrence of the slip boundary condition.

In general, the main result of reducing the HE loss of the blade is that the dedicated channel size, perforation size or spacer size can be increased in absolute terms, which simplifies the manufacturing process. Increasing such a dimension can also lower the pressure and pump losses for a fixed level of HE loss.

Alternatively the length scale of the plurality of elements (plate thickness or spacing between perforations) within each element that makes up the blade body could also be increased to aid manufacturing, while keeping the HE loss at a constant level.

Finally, even the operating frequency can be increased without increasing the HE loss.

Such HE loss reduction can be achieved in a number of ways.

Preferably, a surface texture is provided at least on top of each of the plurality of plates as fluid mixing structure, and/or a hydro-phobic coating layer is provided to each of the plurality of plates, wherein preferably a glass or plastic layer is provided beneath each hydro-phobic coating layer. The addition of surface texture increases thermal homogeneity across the dedicated channels, and reduces the HE loss when the blade is used in an active regenerative magneto-caloric engine. The hydro-phobic coating layer reduces the HE loss by creating a slip boundary condition between its surface and the exchange fluid. The glass or plastic layer can increase the smoothness of the plates before the coating layer is applied. The coating layer can be smoother as well, and thus more effective.

Preferably, the surface texture is printed by ink jet printing techniques or is formed from sand or an equivalent sand-like rough material that is glued to the plurality of plates. Both solutions are simple to achieve, and are low-cost solutions with the necessary mechanical stability.

Preferably, a symmetry breaker is inserted as a fluid mixing structure into each of the plurality of holes or channels, and/or an inner wall of each of the plurality of holes has a rough surface that serves as fluid mixing structure, and/or the inner wall of each of the plurality of holes is provided with a hydrophobic coating layer, which is preferably on top of a glass or plastic layer.

The mixing structures are for mixing the exchange fluid in an active regenerative magneto-caloric engine, and increase the thermal homogeneity of the exchange fluid in the dedicated channels. Consequently HE loss is reduced. Also the hydrophobic coating layer helps to reduce HE loss, since a slip condition is created between the channel surface and the exchange fluid.

Alternatively, such symmetry breakers, rough surfaces or hydrophobic slip layers, can allow larger holes that may be easier to manufacture depending on the magneto-caloric material, without increasing the HE Loss.

In all examples preferably separators are provided between adjacent ones of the plurality of elements, in order to compensate for local temperature gradients at the interfaces of the plurality of elements in an active regenerative magneto-caloric engine.

The present invention of a Multi-Material-Blade can also be applied to electro-caloric materials. The optimal design principles outlined for the AMR transfer equivalently to the AER for electro-caloric engines transfer (although some of the resulting geometries will be different).

The present invention of the Multi-Material-Blade for use in a heat engine is applicable to applications (using the said heat engine) intended for heat pumping, energy recovery from waste heat, as well as refrigeration and cooling.

Manufacturing

The present invention is further directed to a method for fabricating a Multi-Material-Blade for use in an active regenerative magneto-caloric or electro-caloric engine. The method comprises the steps of forming a blade body from a plurality elements made from different magneto-caloric or electro-caloric materials, wherein the plurality of elements are arranged along the length of the blade body. The method further comprises the steps of forming a plurality of dedicated channels, which penetrate the blade body and extend along the length of the blade body, and providing each of the plurality of dedicated channels with a fluid mixing structure or a hydrophobic coating layer.

The method achieves to manufacture a Multi-Material-Blade that can be used as an AMR in an active regenerative magneto-caloric engine, and is particularly improved in terms of reducing the HE loss in the system.

The present invention is further directed to a method for fabricating a Multi-Material-Blade for use in an active regenerative magneto-caloric or electro-caloric engine. The method comprises the steps of forming a blade body from a plurality elements made from different magneto-caloric or electro-caloric materials, wherein the plurality of elements are arranged along the length of the blade body. The method further comprises the steps of forming a plurality of dedicated channels, which penetrate the blade body and extend along the length of the blade body, wherein each of the plurality of elements is formed by stacking a plurality of plates on top of each other, wherein the plurality of plates are separated from each other by at least one spacer printed with ink jet printing techniques (or stencil/screen printing, photolithography, or direct application by dotting or jetting system), and clamping and/or gluing together the plurality of plates, wherein each of the plurality of plates is formed by aligning sub-plates made of a magneto-caloric or electro-caloric material in a frame, applying strips and/or dots to the sub-plates, and baking the aligned sub-plates and the frame to form the plurality of plates. The method is compatible with an automated, low-cost manufacturing process. A cost-competitive, commercially feasible regenerative engine becomes possible.

The methods can comprise further manufacturing steps, in particular steps that form or achieve any advantageous structure and property of the Multi-Material-Blade described in this document. The different examples and structures of the Multi-Material-Blade can further be combined to achieve a combination of advantageous features. For example, all above-described Multi-Material-Blades could be formed with a curved shape to achieve an involute blade design.

BRIEF DESCRIPTION OF THE DRAWINGS

In the following, the present invention will be described in more detail in reference to the attached drawings.

FIG. 1a illustrates how the magneto-caloric effect can be utilized in a simple magneto-caloric engine.

FIG. 1b illustrates how the regenerative magneto-caloric engine operates.

DETAILED DESCRIPTION OF THE INVENTION

As described above the Multi-Material-Blade according to the present invention comprises a blade body 1 that is made from a plurality of elements 2 made from different magneto-caloric or electro-caloric materials. The blade body is divided along its length into the plurality of elements 2. Through the blade body 1 run a plurality of dedicated channels 3, which extend along the whole length of the blade. The plurality of dedicated channels 3 penetrates the blade body 1, so that in an active regenerative magneto-caloric or electro-caloric engine an exchange fluid can pumped through the dedicated channels 3 from one end of the blade to the other. In the following, the present invention will present several examples and designs for a Multi-Material-Blade. The examples can be combined where feasible, in order to achieve combinative advantageous features. Some principles are valid for all examples, but are not repeated in the same detail again and again.

Figure 2A:
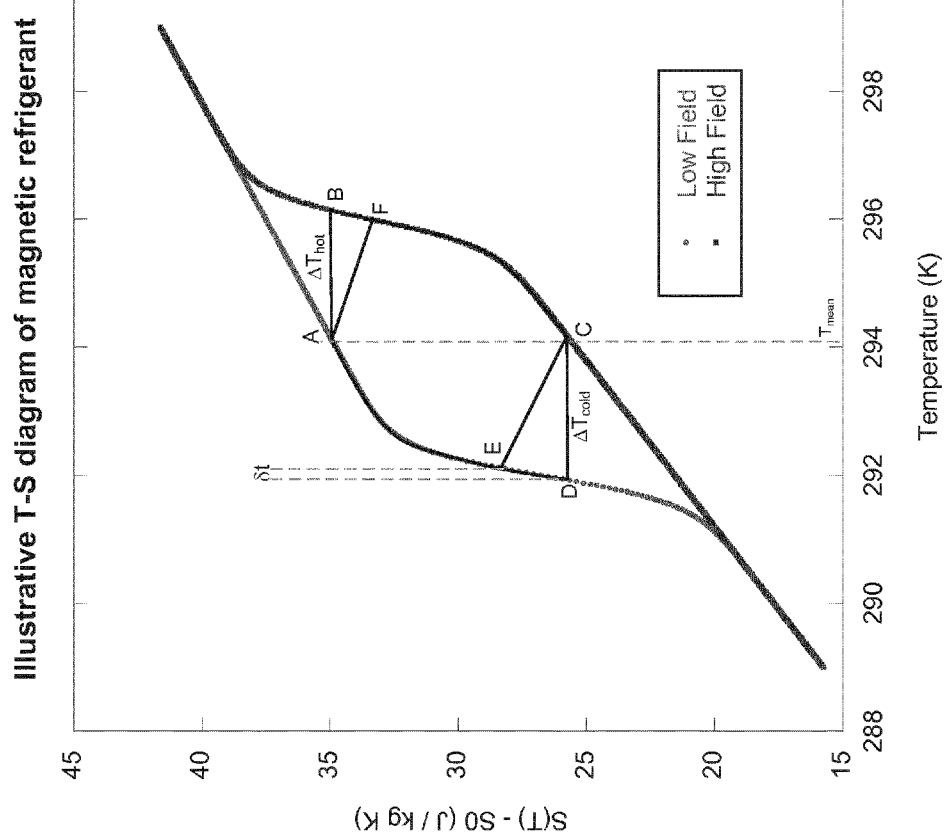
FIG. 2a shows the temperature vs. entropy cycle, of a magnetic refrigerant.
Figure 2B:
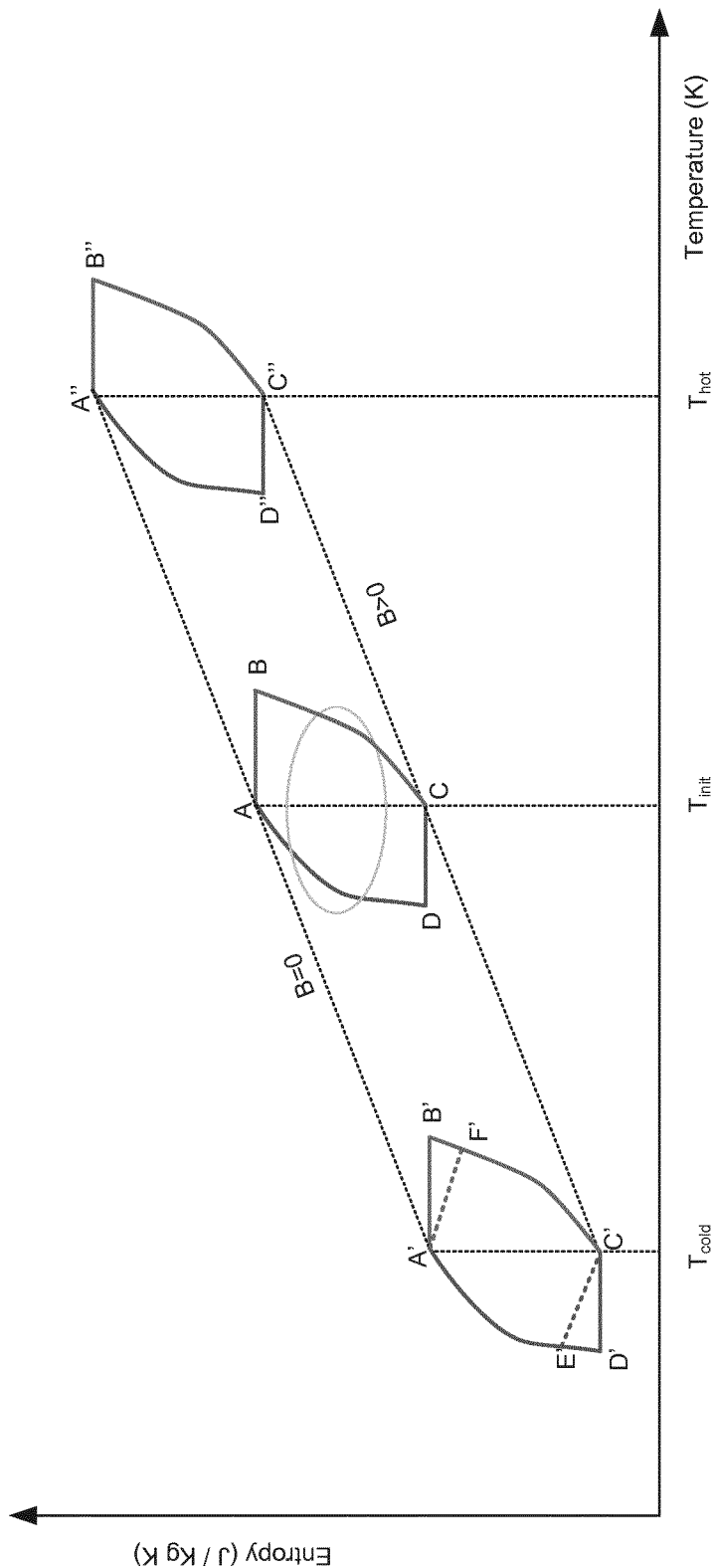
FIG. 2b shows the temperature vs. entropy cycle, which the AMR ideally follows.
Figure 2C:
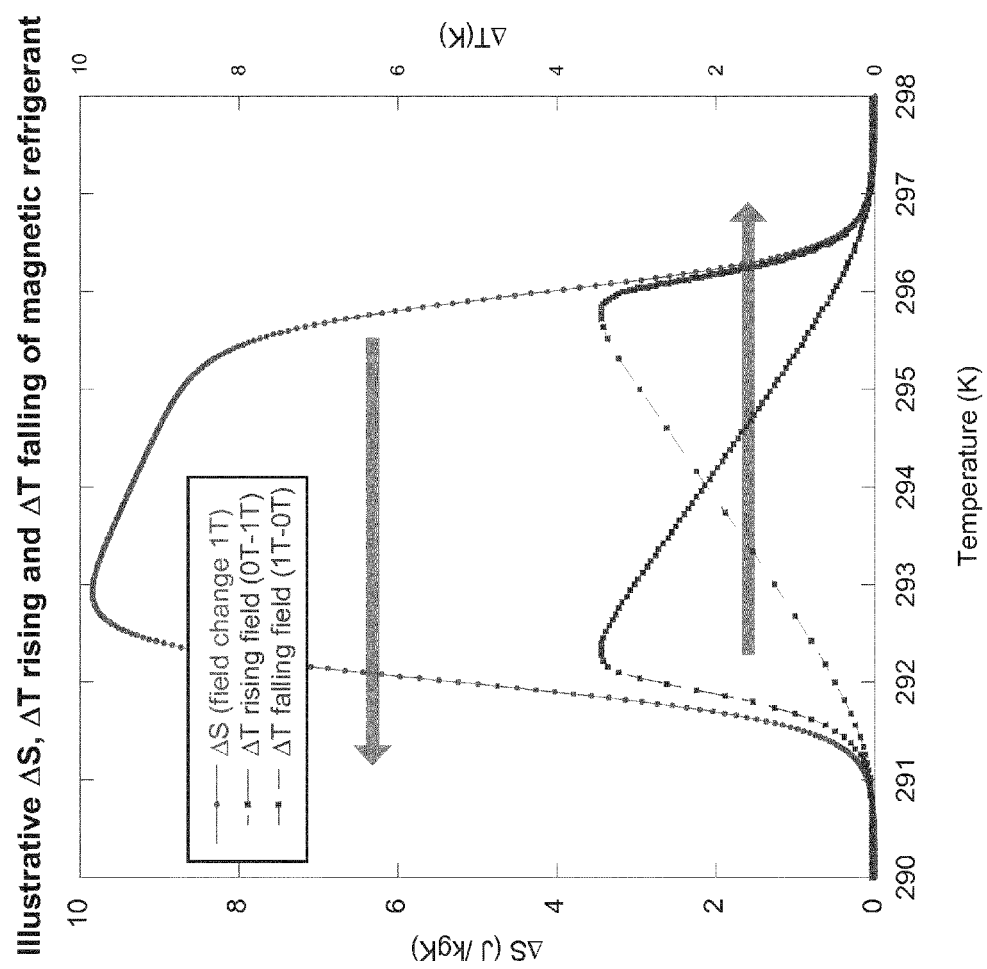
FIG. 2c shows the illustrative ΔS and ΔT properties of a magnetic refrigerant.
Figure 4:
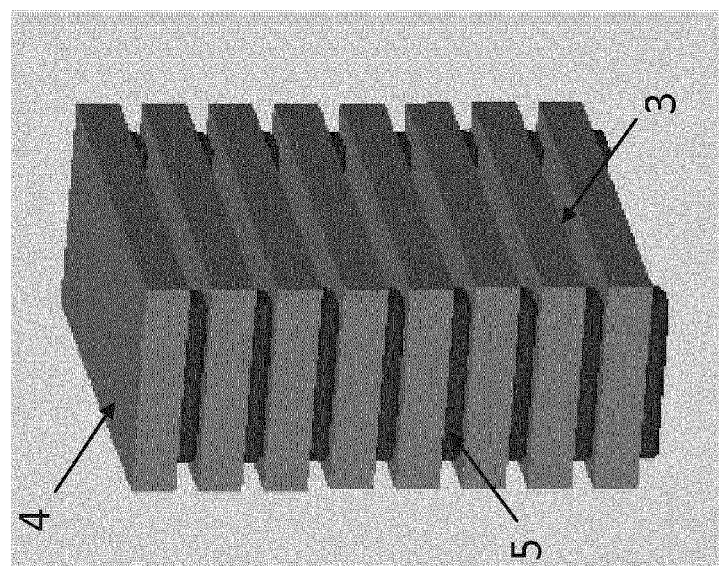
FIG. 4 shows one of a plurality of elements of a Multi-Material-Blade according to the first example.
Figure 3:
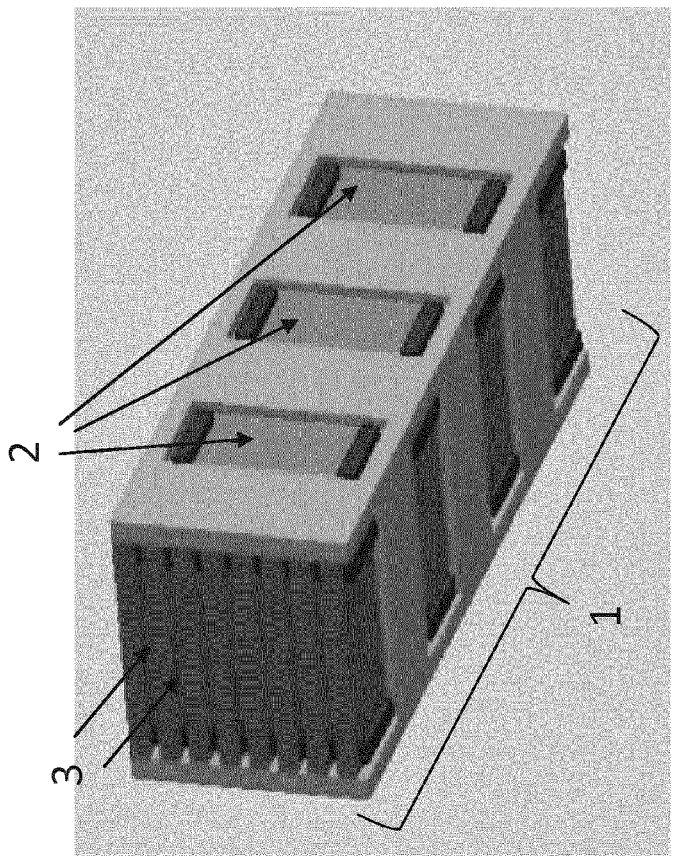
FIG. 3 shows a Multi-Material-Blade according a first example of the present invention.

FIG. 3 shows a first example of a Multi-Material-Blade according to the present invention that is to be used in an active regenerative magneto-caloric engine. In FIG. 3 each of the plurality of elements 2 is fabricated by a stacking technique, wherein the elements 2 are aligned adjacent to each and are clamped and/or glued together, in order to form blade body 1. As shown in FIG. 4, each of the plurality of elements 2 again consists of a plurality of plates 4, which are stacked above each other, and which are separated by spacers 5. The spacers 5 obviously define gaps between adjacent plates 4, and form dedicated channels 3 through each of the elements 2 and through the whole blade body 1.

Each plate 4 is made of a magneto-caloric material, wherein the plates of one element 2 are preferably made of the same material. However, also a variation of materials for the plates 4 of an element 2 can be used. A preferred group of materials is LaFeSi, LaFeSiCo, LaFeSiH, MnPFeAs, MnPFeSi, MnAsSb, MnPFeGe, Gd, GdDy, CoMnSi, CoMnGe, and GdSiGe, which may contain various dopants or ratios of the stated elements. Each of the plurality of elements 2 comprises at least one different magneto-caloric material compared to the other elements, or comprises at least one material that differ in its Curie temperature Tc. A difference in Curie temperature can for example be achieved by different doping of the same material.

Each plate 4 has a thickness of around 50 μm to 1500 μm, preferably 70 μm to 700 μm, more preferably 90 μm to 400 μm. The values depend slightly on the used magneto-caloric material. The plates 4 of each element 2 can all have the same size and shape, as shown in FIG. 4, but can also be different from each other, e.g. in order to implement a curvature of the blade. To form an involute blade body all the curvatures are the same.

The plates 4 are shown in FIG. 4 to have a rectangular shape, but this is in no way limiting, and other shapes, like squares, triangles or circles can be imagined. The plates 4 are also shown as being flat, but as will be described later in respect to FIG. 16 the plates 4 can also exhibit a curvature of either of their surfaces. The curvature can be convex or concave.

The plates 4 can be made by extrusion techniques, wherein magneto-caloric powders are bound together by some sort of binder to form a solid plate 4. Naturally the plates 4 can also be made of solid blocks of a single magneto-caloric material, or an alloy of magneto-caloric materials.

In any case, the plates 4 are to have a thermal conductivity that is as low as possible in a range of in a range of 0.1 W/mK to 10 W/mk, preferably 0.1 W/mK to 5 W/mk, more preferably 0.1 W/mK to 2 W/mk. Then also each of the plurality of elements 2 will have a low thermal conductivity. In case the plates 4 are fabricated by extruded powders that are mixed with binders, the binders should have a thermal conductivity that is lower or equal to the magneto-caloric materials. Consequently materials like plastic are preferred over metals for the binding agent. The low thermal conductivity of the plates 4 and the plurality of elements 2, respectively, minimize losses in the active regenerative magneto-caloric engine that are caused by backflow of the heat through the Multi-Material-Blade. Note that separators between adjacent ones of the plurality of elements 2 will not reduce the backflow as a % of the total cooling power. However, separators between adjacent ones of the plurality of elements 2 can be used for assembly purposes, and to reduce local temperature gradients between adjacent materials.

The spacers 5, which define the dedicated channels 3 through the blade body 1, have a thickness of 5 to 100 μm, preferably 10 μm to 75 μm, more preferably 15 to 60 μm. The values are again dependant on the magneto-caloric material of the plates 4, and also on the exchange fluid that runs through the dedicated channels 3 in an active regenerative engine. Ideally, the spacers 5 are as small as possible, since a narrower channels 3 experience less HE loss. However, a compromise between HE loss and viscous and pressure losses has to be taken into account. The spacers are preferably made of a low thermal conductivity material, that lies in the above-given range for the magneto-caloric materials or lower.

The plurality of elements 2 in FIG. 3 can be aligned such along the length of the blade body 1, that each of the plurality of elements 2 is rotated by 90° in respect to the elements 2 adjacent thereto. Of course any other angle can be chosen. The flow of the exchange fluid will be in a way that the exchange fluid is mixed, so as to further reduce the HE loss.

In an active regenerative magneto-caloric engine, one end of the blade body 1 is the cold end and the other is the hot end. An exchange fluid will be passed through the dedicated channels 3 from the hot end to the cold end and from the cold end to the hot end, when a magnetic field is applied or taken away from the Multi-Material-Blade, as appropriate. After the exchange fluid has gone through several cycles of pumping, a temperature gradient is established from the cold end of the blade body 1 to the hot end thereof. The total temperature gradient depends on the design of the blade, in particular the selection and arrangement of the magneto-caloric materials.

The plurality of elements 2 that form the blade body 1 are thus to be made of such magneto-caloric materials, and/or doped in such a manner, that they can be arranged along the blade body in a way that the Curie temperatures of the magneto-caloric materials in each of the elements 2 trace the temperature gradient that establishes across the whole length of the blade body 1. The temperature gradient is preferably linear, which requires an adaption of the Curie temperatures, the length, and temperature span of each of the plurality of elements. Each of the plurality of elements 2 is further to be arranged in a position, where it works as close to its Curie temperature as possible. The plurality of elements 2 can have different lengths or can have the same length, in direction of the dedicated channels 3. The Curie temperatures, the length and the temperature change $\Delta T$ across each of the plurality of elements 2 should preferably be selected so that the cooling capacity is close to uniform, wherein uniform is understood to have a deviation of ±30%, preferably ±20%, more preferably ±10% immediately between the elements located along the length of the blade body 1, i.e. at boundaries of two elements.

Local temperature gradients can establish in the blade body 1, between elements, and generate entropy that disrupts the performance of any active regenerative magneto-caloric engine. The heat can then not be transferred optimally from the plurality of elements to the exchange fluid. To counter this effect spacers or separators between some or all of the plurality of elements 2 may be used for assembly reasons, and to reduce local temperature gradients that may arise between sub-blades possessing different $\Delta T$ at the boundary between the two materials. The above arrangement of magneto-caloric materials (and also electro-caloric materials) is valid for all examples of a Multi-Material-Blade according to the present invention.

Figure 5:
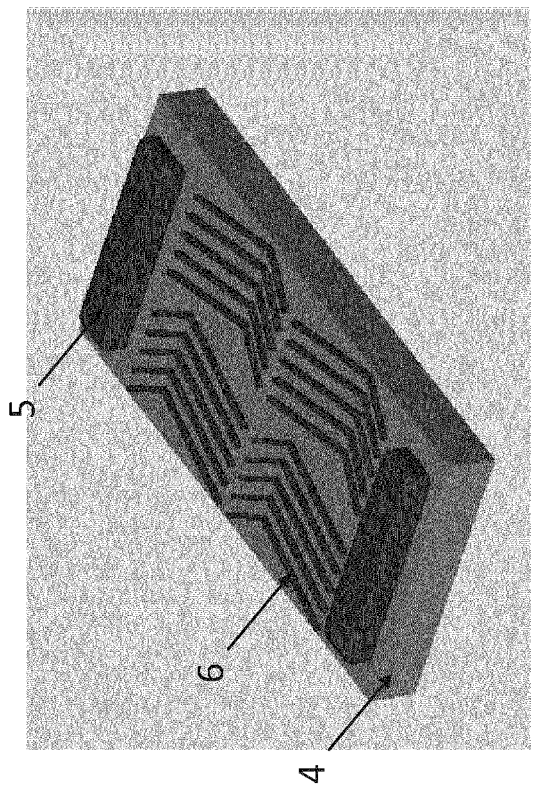
FIG. 5 shows a mixing structure of a Multi-Material-Blade according to the first example.

FIG. 5 shows one of said plurality of plates 4, on which two spacers 5 are printed. The spacer 5 can be printed by ink jet printing techniques, which enables low cost and automated manufacturing. The spacers can of course be printed or glued by other techniques. The number of spacers 5 is not required to be two, but at least one spacer 5 should be present. Additionally, a surface texture 6 can be printed, for example by ink jet printing techniques, or be otherwise applied to the one or both surfaces of some or all plates 4. The addition of surface texture 6 increases the thermal homogeneity across the respective dedicated channel 3, when exchange fluid is pumped through the channel 3 in an active regenerative magneto-caloric or electro-caloric engine. The mixing of the exchange fluid reduces the HE loss, and thus increases the overall performance of the engine. The shape and the dimensions of the surface texture 6 can be different from the one shown in FIG. 5.

Alternatively, or in addition, to the surface texture 6, a hydrophobic coating layer can be printed or otherwise applied onto some or each of the plates 4. The hydrophobic coating layer can be on both or on one surface of the plates 4. The hydrophobic coating layer and the surface texture 6 can for example be on opposite surfaces of a plate 4. Optionally, a thin glass or plastic layer may be arranged beneath each hydrophobic coating layer. A hydrophobic coating layer can create a slip boundary condition between the surface of the plate 4, i.e. the surface of the dedicated channel 3 and the exchange fluid, when the blade is used in an active regenerative magneto-caloric engine. The slip boundary condition serves to reduce the HE loss.

Figure 6:
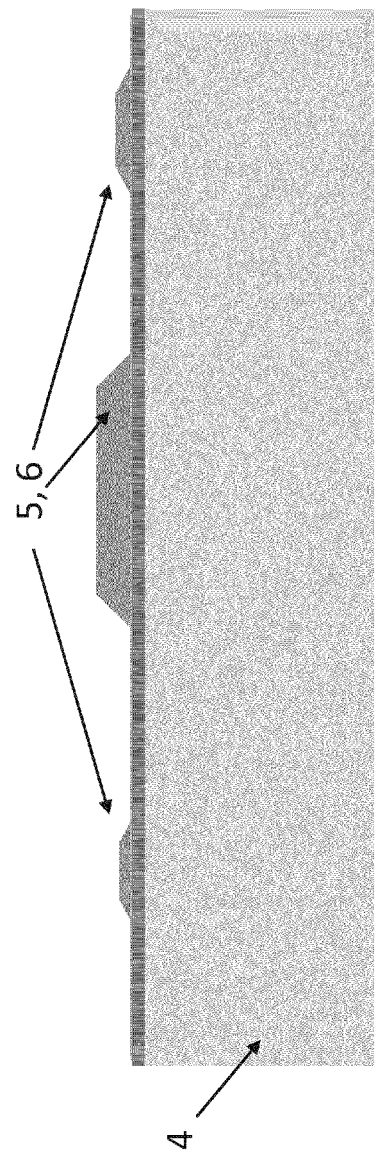
FIG. 6 shows a mixing structure of a Multi-Material-Blade according to the first example.

Another mixing structure that can be applied with a stacked plate 4 assembly is shown in FIG. 6. Instead of printing spacers and/or surface texture 6 with e.g. ink jet printing techniques, sand powder is sieved to the right length scale, and sharp edged sand structures are formed and are glued to the plate 4. The sharp edged sand structures serve both as spacers 5 and as a mixing structure 6. The structures are utilized to define the width of the dedicated channels 3 and to reduce the HE loss. Preferably, low thermal conductivity materials (i.e. lower than the thermal conductivity of the magneto-caloric materials) should be used for the powder or sand, as to keep the thermal conductivity of each of the plurality of elements 2 as small as possible for the above-described reasons.

Figure 7:
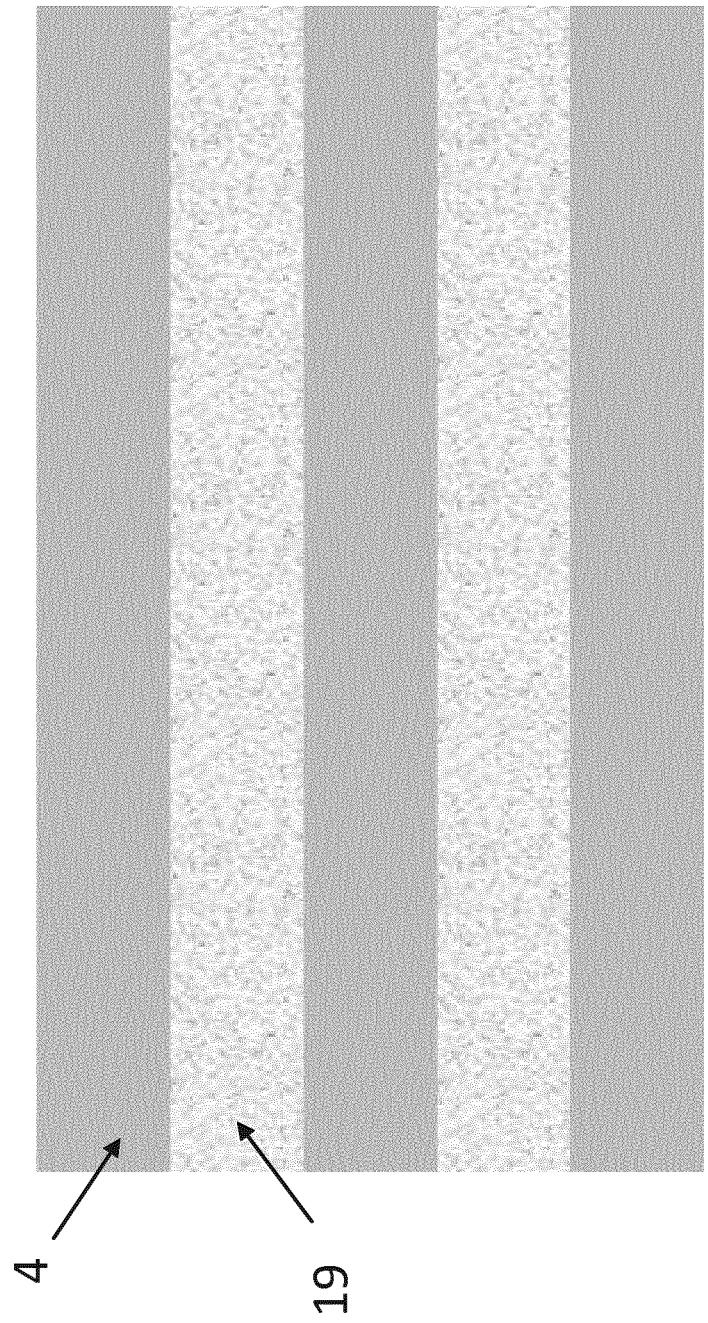
FIG. 7 shows one of a plurality of elements of a Multi-Material-Blade according to the first embodiment.

FIG. 7 shows one of a plurality of elements 2 of another second example of the present invention. The example is similar to and compatible with the first example, since again plates 4 can be stacked to form the plurality of elements 2. The blade body 1 of the second embodiment exhibits a cross-section that has regions of different porosity in one direction, which is in FIG. 7 the vertical direction. The regions of different porosity are separated from each other and defined by a sudden jump in porosity that is at least 10%, but is preferably at least 20%, more preferably at least 30%. In FIG. 7 plates 4 that represent regions of low porosity (the porosity can even be zero, but can also be of finite value) are alternatingly stacked on top of each other with porous layers 19 in between. The porous layers 19 form the dedicated channels 3 as well as the spacers 5. Exchange fluid will preferably flow through the region with the higher porosity (open structure), in the case of FIG. 7 the layers 19 between the plates 4. However some amount of exchange fluid could also flow through the region of lower porosity. The magneto-caloric material preferably has less than 10% of porosity, which is also true for the magneto-caloric materials used in all other embodiments.

Many designs of regions of different porosity in the blade body 1 are possible. The blade body 1 can exhibit at least two regions of different porosity along its vertical or its horizontal direction, but can also have multiple regions of differing porosity, and even each region can have a different porosity. The cross-section of each of the plurality of elements 2 of the blade body does not necessarily have to be the same. Also the number of regions of higher and or lower porosity can differ from element 2 to element 2.

The regions of different porosity can be designed such that they serve as a mixing structure 6, which reduces the HE loss in a refrigerant system. Additionally, the different porosities can be used to control the pressure in the Multi-material-Blade, and thus to control and reduce vicious losses. The porous layer 19 shown in figure has a preferred vertical width of 15 to 80 µm, at maximum 125 µm, depending on the porosity. The material the porous layer 19 can be, for example, collagen glycosaminoglycan scaffolds or spontex. Further, collagen foam, polytetrafluoroethylene or hydroxyapatite ceramic can be used. Porosities are preferably in a range of 25 to 95%. Pore sizes are preferably in a range of 1 µm to 100 µm. Hydroxyapatite ceramic exhibits micropores. The size of the micro-pores is preferably 0.1 to 10 µm. At least one region of high porosity can be made flexible, for example as a sponge-like structure that can adapt its size and shape. The flatness requirements of the plates 4 can thus be reduced for assembling the plurality of stacked elements of the blade body 1.

Figure 9:
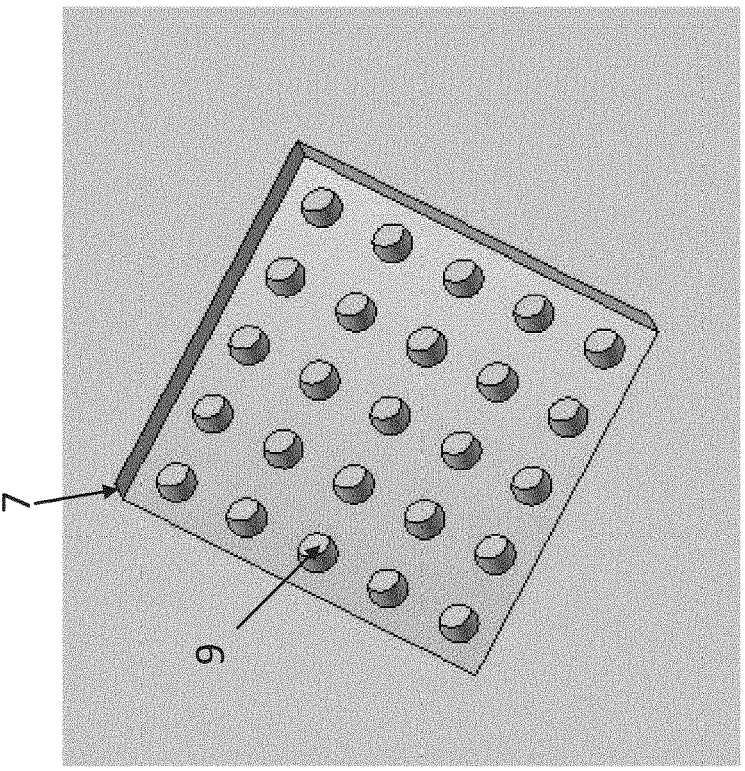
FIG. 9 shows one of a plurality of elements of a Multi-Material-Blade according to the second example.
Figure 8:
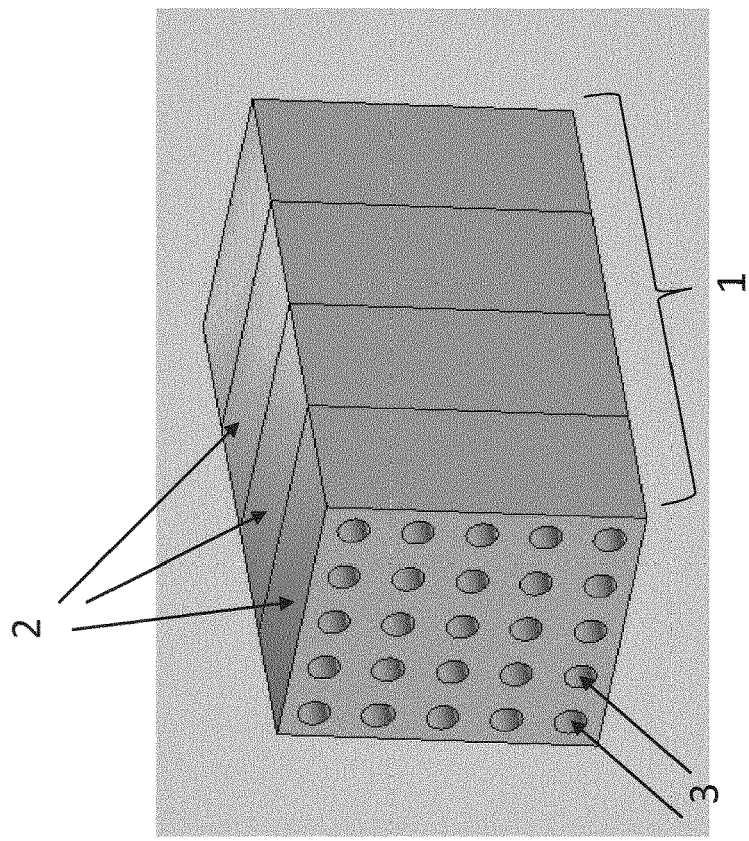
FIG. 8 shows a Multi-Material-Blade according a second example of the present invention.

FIG. 8 shows another third example of a Multi-Material-Blade according to the present invention. Again the blade body 1 consists of a plurality of elements 2 and dedicated channels 3. FIG. 9 shows a perforated plate 7 that forms one of the plurality of elements 2 of FIG. 8. A plurality of perforated plates 7 are ranged along the length of the blade body 1, and the dedicated channels 3 run through all plates 7. To this end, each perforated blade 7 comprises perforations 9, as shown in FIG. 8. The perforated plate 7 can be produced by a drilling, extrusion or pressing process or through other powder processing techniques. The holes can be angular, rectangular or round, or can have any other shape. The diameter of each hole can be optimized, and is ideally 10 to 150 µm, preferably 15 to 110 µm or more preferably 20 um to 85 um. The distance between two adjacent holes is preferably in a range of 60 µm to 2 mm, more preferably 80 to 1000 µm, more preferably 100 um to 650 um. The length scales are depending on the magneto-caloric material, from which each of the perforated plates 7 is made, but are equivalent to the length scale requirements of the dedicated channels 3 described in the first example. The perforated plates 7 are shown as being rectangular or square shaped, but can have other shapes as well. The perforated plates 7 are again shown as flat plates 7, but as will be described later the perforated plates 7 can also exhibit a curvature or a bending angle.

Figure 10:
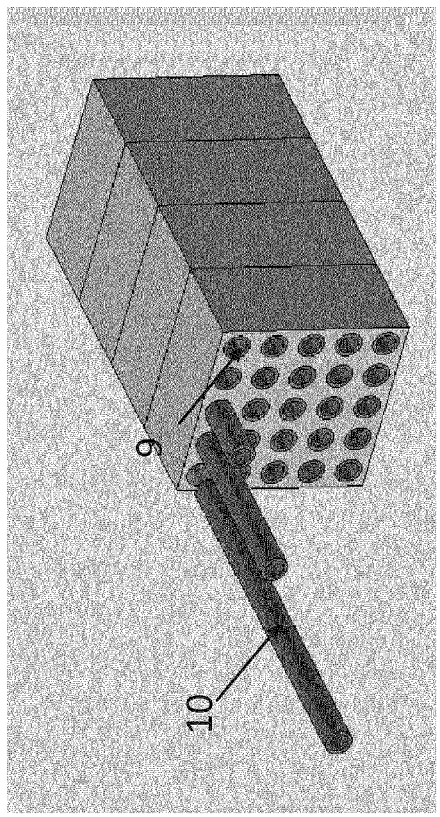
FIG. 10 shows a Multi-Material-Blade according to the second example.

When the perforated plates 7 are stacked together, as shown in FIG. 8, ideally no spacers are used simply for trying to minimize backflow loss. However, spacers could be used if necessary, to allow more even stacking, and a reduction of local temperature gradients. Preferably, each of the perforated plates 7 has an alignment notch so that the assembly of the blade body 1 is simple and reliable. Each perforated plate 7 is again made from a different magneto-caloric material, which can be selected from the same group of material described in the first example. The requirements for selecting the Curie temperatures each of the plurality elements 2 are the same as mentioned above. If production techniques, like extrusion or pressing, with which the perforated plates 7 are manufactured, work only for larger holes than are preferably used in the Multi-Material-Blade, then pipe inserts can be additionally applied, in order to optimize flow of exchange fluids through the dedicated channels 3. Thereby, the HE loss can be minimized. FIG. 10 shows pipe inserts 10 that are inserted into each of the plurality of holes 9, in order to reduce their diameter, and accordingly reduce the HE loss. The pipe inserts 10 can even have different diameters, so that not all dedicated channels 3 have the same diameter. The pipes 10 are preferably made of a material with a low heat capacity, and a low thermal conductivity (e.g. glass). The thermal conductivity of each of the plurality of elements 2, i.e. of each perforated plate 7 should lie in a range of 0.1 W/mK to 10 W/mk, preferably 0.1 W/mK to 5 W/mk, more preferably 0.1 W/mK to 2 W/mk. The reasons have been described above.

Figure 11:
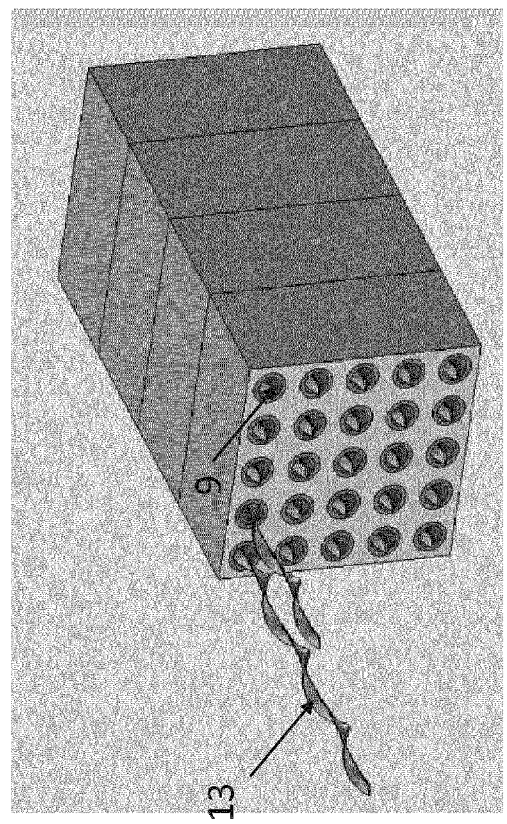
FIG. 11 shows a mixing structure of a Multi-Material-Blade according to the second example.

Into each of the pipes 10 or into each of the holes 9, symmetry or flow breakers 13 can be inserted. As can be seen in FIG. 11, these symmetry breakers 13 act as mixing structures, and can for example be longitudinally extended spirals that run through the dedicated channels 3. The symmetry breakers 13 support the mixing of the exchange fluid, when it is pumped through the dedicated channels 3, and thus help to reduce the HE loss. The symmetry breakers are preferably made of a lower heat capacity material, like plastic, so that the heat is largely transferred to the exchange fluid when the magneto-caloric materials change temperature, and a low thermal conductivity material, i.e. no higher than the thermal conductivity of the magneto-caloric material. This is to keep the total thermal conductivity of the perforated plates 2 as low as possible.

Figure 12:
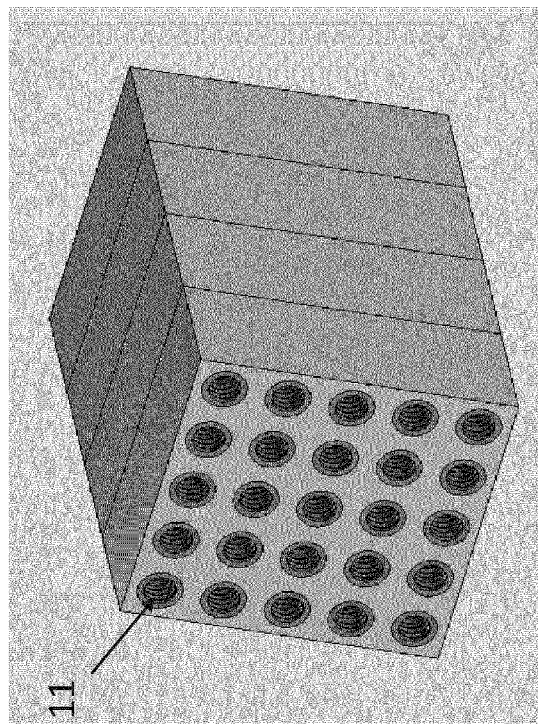
FIG. 12 shows a mixing structure of a Multi-Material-Blade according to the second example.

Another possibility to provide a mixing structure that reduces the HE loss are rough walls 11 on the insides of some or of each of the holes 9 or the pipe inserts 10, respectively. FIG. 12 shows the roughness of the inside of the walls 11. The roughness is preferably tuned to minimize pressure loss and HE loss at the same time. Due to the rough walls a larger diameter hole 9 or a thinner wall pipe 10 can be used without increasing the HE loss. The roughness can be produced by grooves, protrusions, prongs, or other roughness patterns.

Figure 13:
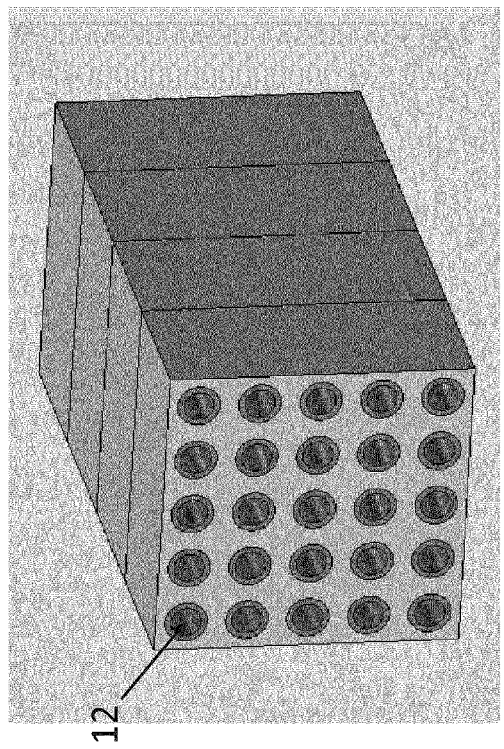
FIG. 13 shows a Multi-Material-Blade according to the second example.

An alternative for reducing HE loss is shown in FIG. 13. The inside of the holes 9 or the pipe inserts 10 are provided with a slip coating layer. For example a hydrophobic layer can be applied to the inside walls. Also a glass pipe 10 can be inserted in the holes 9. The coating can be a standard glass hydrophobic coating layer. As has been described above, the slip coating layer creates a slip boundary condition between the exchange fluid and the surface of the dedicated channel 3, and reduces the HE loss significantly. It is possible that some holes 9 are provided with hydrophobic coating layers and that some other holes are provided with symmetry breakers 13 or rough walls. Symmetry breakers 13 are even compatible with coating layers in a single hole 9.

The use of HE loss reduction techniques can either drive a more efficient system. Alternatively, for a given loss, larger channels or holes, which may be easier to manufacture, are allowed.

Figure 14:
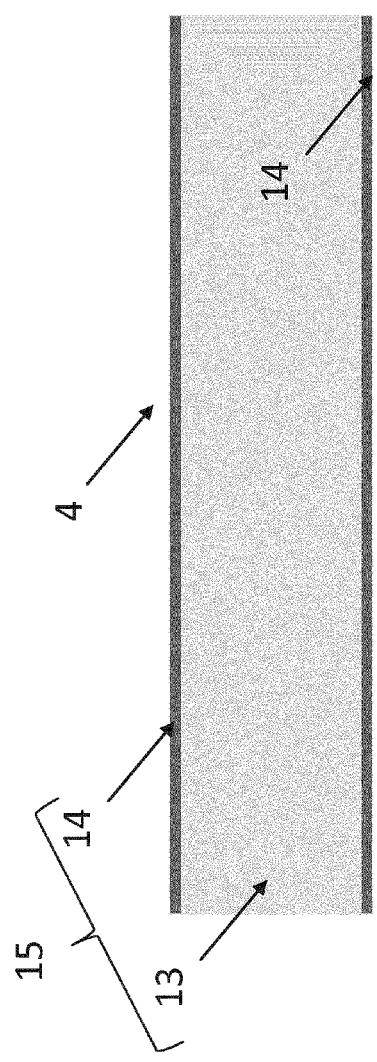
FIG. 14 shows an electro-caloric element of a Multi-Material-Blade according to a third example of the present invention.
Figure 15:
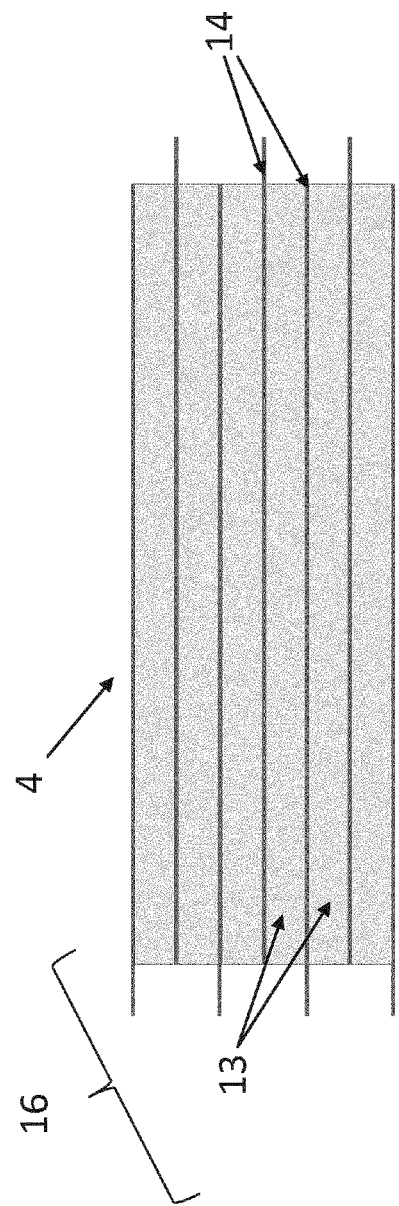
FIG. 15 shows one of a plurality of elements of a Multi-Material-Blade according to the third example.

The Multi-Material-Blades of the present invention can also have a plurality of elements 2 that are made of at least one electro-caloric element 15, which represents a fourth example of the present invention. FIG. 14 shows an electro-caloric element 15. The electro-caloric element comprises an electro-caloric material 13 that is sandwiched by two electrodes 14, to which a voltage can be applied. The structure of the electro-caloric element 15 is thus basically a capacitor structure formed on the electro-caloric material 13. The electro-caloric material is similar to the magneto-caloric material, except that the material undergoes a temperature change $\Delta T$ that is driven by an electric field rather than a magnetic field. When a voltage is applied to the two electrodes, an electric field is created across the electro-caloric material, and the temperature of the material 13 changes. FIG. 15 shows a multi-layer capacitor structure 16. This multi-layer capacitor structure 16 differs from the embodiment shown in FIG. 14 by utilizing multiple layers of a single electro-caloric material 13 separated by multiple electrodes 14. This embodiment has the advantage of allowing much thinner layers of electro-caloric material, and thus smaller voltages can be used, or larger electric fields can be generated thereby increasing $\Delta S$ and $\Delta T$ and improving the cooling capacity.

The electro-caloric element 15 or the multi-layer capacitor structure 16 can be used in the manner of the plates 4 in FIG. 4, to make multilayer structures with dedicated channels 3 and spacers 5.

However, the electro-caloric element 15 or the multi-layer capacitor structure 16 can also have perforations or holes, and each form one of the plurality of elements 2 that establish dedicated channels along the blade body as in FIG. 8.

The electrodes 14 can be metal electrodes, and are preferably 5% or less than the thickness of the electro-caloric element 15.

The electro-caloric Multi-Material-Blade has the same requirements to the choice of materials as the magneto-caloric Multi-material-Blades described above. A transition temperature, around which there is a change in entropy, should follow the temperature defined by the temperature gradient along the blade in an active regenerative electro-caloric engine. In principle, the ΔT and ΔS in electro-caloric materials is in principle much larger than in magneto-caloric materials. This is due to the fact that bigger electric fields can be applied than magnetic ones, especially in the multi-layer capacitor structures. The large ΔT and ΔS also exist over wider temperature ranges, which means that less materials are needed along the length of an AER. Nevertheless, the basic principles remain the same as for an AMR.

Figure 16:
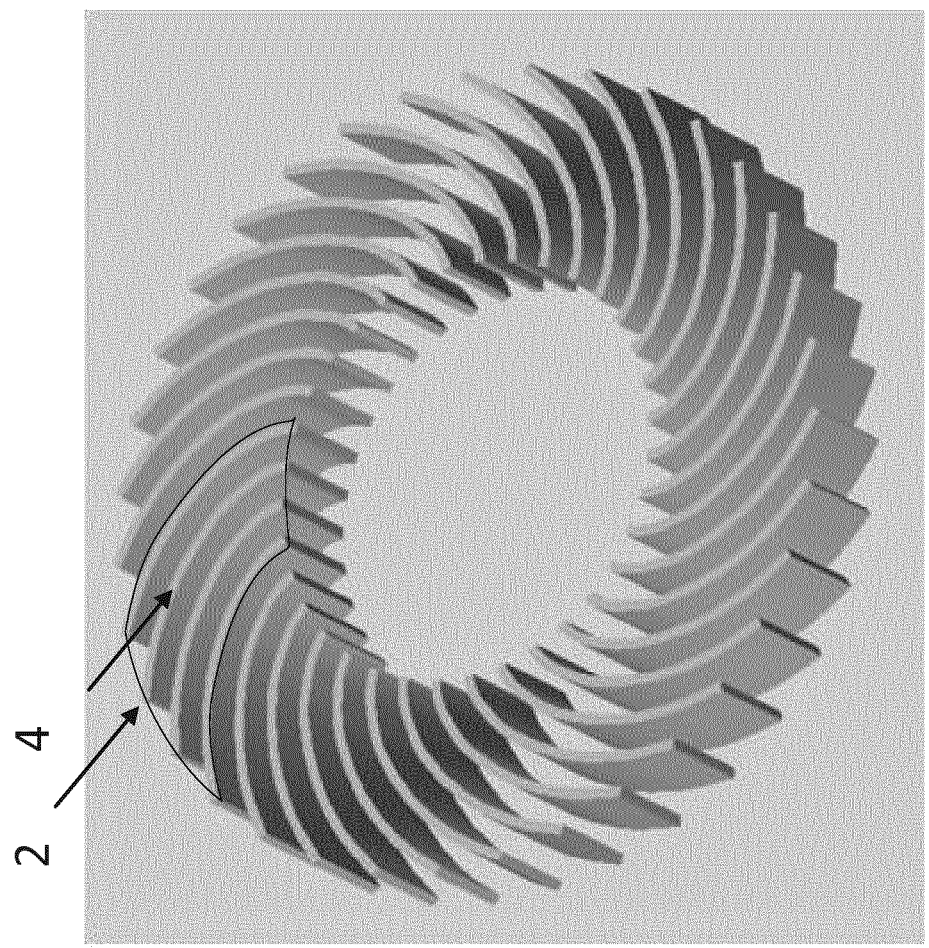
FIG. 16 shows an involute design of Multi-Material-Blades according to a fourth example of the present invention.

As has been described in short above, the shapes of the Multi-Material-Blades have been described as being flat. However, curved shapes are advantageous when using the blades with a rotary system, i.e. when multiple blades have to be packed and assembled in a circle. FIG. 16 shows an element 2 that has a curved shape, since the plurality of plates 4 of the element 2 is composed of a curved shape. The element 2 thus has an involute design, which provides the possibility of perfect packaging in a complete circle, with constant plate separation within each element, as shown in FIG. 16. Since the spacing between the elements stays constant, in comparison to a packing of cuboid elements in a circular geometry, a 30% smaller field volume is necessary, since the magnetic field utilization is much higher. Thus smaller and less expensive magnets can be used in the respective active regenerative engine. The utilization of the magnetic field can reach up to 100%. Each element can still be made of a number of individual plates, like the stacked plates 4 from FIG. 4 or the perforated plates 7 from FIG. 9. The curved plates can be manufactured by curve extrusion. Also for the involute design of FIG. 16 rough walls or surface textures can be applied to each of the dedicated channels 3, also slip coating can be used.

Multiple elements (2) can be combined vertically (or radially), to create a multi-material-blade structure (1). In general all of the examples can use the advantageous features and enhancements of the other examples. The examples can also be combined with each other.

Figure 17:
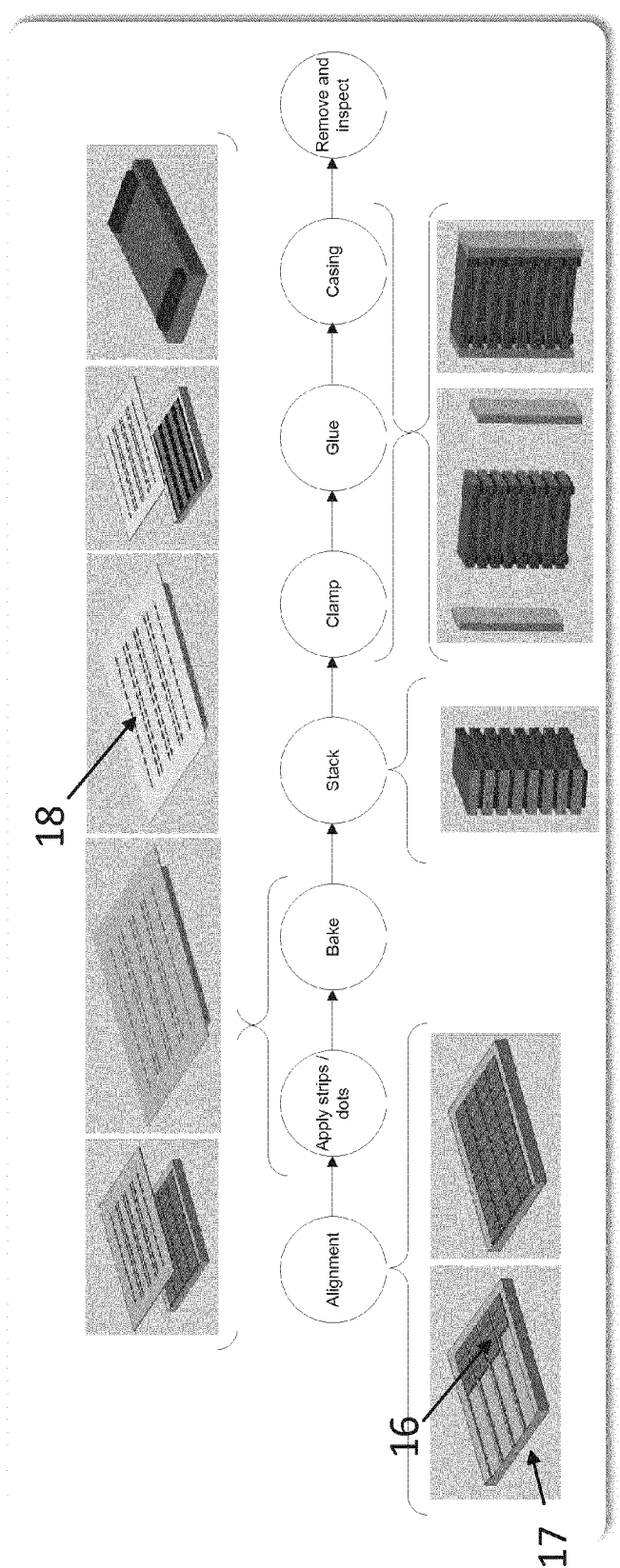
FIG. 17 shows manufacturing steps of a Multi-Material-Blade according to the first example of the present invention.

FIG. 17 shows an example of how a Multi-Material-Blade according to the present invention, in particular the first embodiment, can be fabricated. In general a blade body 1 is formed of a plurality of elements 2, wherein each of the plurality of elements 2 is made from a different magneto-caloric or electro-caloric material. The plurality of elements 2 are arranged along the length of the blade body 1, and dedicated channels 3 are created that penetrate the blade body 1. Finally a mixing structure and/or a hydrophobic coating layer can be provided to each of the dedicated channels 3.

In FIG. 17 each of the plurality of elements 2 is formed by stacking a plurality of plates 4 on top of each other. Each of the plurality of plates 4 is formed by aligning sub-plates 16 in a frame 17, applying strips and dots 18 on the sub-plates and baking the aligned sub-plates 16 together with the frame 17, in order to form plates 4. Then the plates 4 are stacked on top of each other with spaces 5 in between, are clamped or glued together, for example at the sides, and are optionally encased. Finally the plurality of elements 2 are put together to form the blade body 1, wherein preferably each stack is rotated by preferably 90° in respect to its adjacent plate stacks.

In summary the present invention describes the design and fabrication of Multi-Material-Blades used as active regenerative regenerators in active regenerative magneto-caloric or electro-caloric engines. The blades consist of a plurality of elements 2 that divide the blade body along its length. Each element 2 is made of a different magneto-caloric or electro-caloric material, and a plurality of dedicated channels 3 penetrate the blade body 1 and extend along the length of the blade. The dedicated channels 3 can be provided with fluid mixing structures, porous layers or hydrophobic coatings to reduce the HE loss in an active regenerative engine. The Multi-Material-Blades are obtainable by ink jet (or equivalent) techniques with reduced costs. The Multi-Material-Blades can further have a curved shape to form an involute blade body 1. All measures can improve the performance of active regenerative magneto-caloric or electro-caloric engines, and lay the basis for commercial solutions.

The invention claimed is:

1. Multi-Material-Blade for use in an active regenerative magneto-caloric or electro-caloric engine, the blade comprising
   a blade body (1) made from a plurality of elements (2) made from different magneto-caloric or electro-caloric materials, wherein the blade body (1) is divided along a length of said blade body into said plurality of elements (2) so that the plurality of elements (2) are arranged along the length of the blade body (1);
   a plurality of dedicated channels (3), which penetrate each of the plurality of elements (2) and the blade body (1), wherein each of the plurality of dedicated channel (3) extends along an entire length of the blade, and
   wherein each of the plurality of elements (2) in the blade body (1) is rotated in respect to an adjacent element (2) of each of the plurality of elements (2).

2. The Multi-Material-Blade of claim 1, wherein each of the plurality of elements (2) in the blade body (1) is rotated in respect to the adjacent element of each of the plurality of elements (2) by 90°.

* * * * *